US009037564B2

(12) United States Patent
Lesavich et al.

(10) Patent No.: US 9,037,564 B2
(45) Date of Patent: May 19, 2015

(54) METHOD AND SYSTEM FOR ELECTRONIC CONTENT STORAGE AND RETRIEVAL WITH GALOIS FIELDS ON CLOUD COMPUTING NETWORKS

(76) Inventors: Stephen Lesavich, Kenosha, WI (US); Zachary C. Lesavich, Kenosha, WI (US)

( * ) Notice: Subject to any disclaimer, the term of this patent is extended or adjusted under 35 U.S.C. 154(b) by 325 days.

(21) Appl. No.: 13/467,210

(22) Filed: May 9, 2012

(65) Prior Publication Data

US 2012/0278622 A1 Nov. 1, 2012

Related U.S. Application Data

(63) Continuation-in-part of application No. 13/097,227, filed on Apr. 29, 2011, now Pat. No. 8,463,765.

(51) Int. Cl.
G06F 7/00 (2006.01)
G06F 17/30 (2006.01)
H04W 4/00 (2009.01)

(52) U.S. Cl.
CPC ...... *G06F 17/30864* (2013.01); *G06F 17/3089* (2013.01); *H04W 4/003* (2013.01)

(58) Field of Classification Search
CPC ............... G06F 17/30864; G06F 17/30867; G06F 17/30637; G06Q 30/02; G06Q 30/0241
USPC ......................................... 707/706
See application file for complete search history.

(56) References Cited

U.S. PATENT DOCUMENTS

| 6,434,662 | B1 * | 8/2002 | Greene et al. ............ 711/108 |
| 7,269,277 | B2 | 9/2007 | Davida |
| 7,269,615 | B2 | 9/2007 | Stein et al. |
| 7,278,085 | B1 | 10/2007 | Weng et al. |
| 7,283,628 | B2 | 10/2007 | Stein et al. |
| 7,290,197 | B2 | 10/2007 | Ball |
| 7,343,472 | B2 | 3/2008 | Porten et al. |
| 7,343,546 | B2 | 3/2008 | Edirisooriya et al. |
| 7,350,126 | B2 | 3/2008 | Winograd et al. |
| 7,398,456 | B2 | 7/2008 | Piret et al. |
| 7,418,645 | B2 | 8/2008 | Srivastava |
| 7,421,076 | B2 | 9/2008 | Stein et al. |
| 7,426,676 | B2 | 9/2008 | Vityaev |
| 7,451,310 | B2 | 11/2008 | Hall et al. |
| 7,464,128 | B1 | 12/2008 | Pitsianis et al. |
| 7,464,323 | B2 | 12/2008 | Piret et al. |
| 7,472,334 | B1 | 12/2008 | Scott et al. |
| 7,502,988 | B2 | 3/2009 | Piret et al. |
| 7,508,937 | B2 | 3/2009 | Stein et al. |
| 7,600,176 | B2 | 10/2009 | Mead et al. |

(Continued)

*Primary Examiner* — Taelor Kim
*Assistant Examiner* — Lin Lin Htay
(74) *Attorney, Agent, or Firm* — Lesavich High-Tech Law Group, S.C.; Stephen Lesavich

(57) ABSTRACT

A method and system for electronic content storage and retrieval with Galois Fields on cloud computing networks. The electronic content is divided into plural portions and stored in plural cloud storage objects. Storage locations for the plural cloud storage objects are selected using a Galois field and the plural cloud storage objects are distributed across the cloud network. When the electronic content is requested, the plural portions are retrieved and transparently combined back into the original electronic content. No server network devices or target network devices can individually determine locations of all portions of the electronic content on the cloud communications network, thereby providing layers of security and privacy for the electronic content on the cloud communications network.

20 Claims, 12 Drawing Sheets

(56) References Cited

U.S. PATENT DOCUMENTS

| | | | |
|---|---|---|---|
| 7,607,068 B2 | 10/2009 | Gopal et al. | |
| 7,634,091 B2 | 12/2009 | Zhou et al. | |
| 7,685,503 B2 | 3/2010 | Ovchinnikov et al. | |
| 7,693,928 B2 | 4/2010 | Stein et al. | |
| 7,694,156 B2 | 4/2010 | Gammel et al. | |
| 7,711,152 B1 | 5/2010 | Davida | |
| 7,774,687 B2 | 8/2010 | Wu | |
| 7,793,196 B2 | 9/2010 | Jiang et al. | |
| 7,797,612 B2 | 9/2010 | Gopal et al. | |
| 7,805,665 B2 | 9/2010 | Chou et al. | |
| 7,826,613 B2 | 11/2010 | Rose et al. | |
| 7,831,895 B2 | 11/2010 | Lin | |
| 7,843,459 B2 | 11/2010 | Hansen et al. | |
| 7,860,145 B2 | 12/2010 | Knight et al. | |
| 7,870,468 B1 | 1/2011 | Vanka et al. | |
| 7,889,204 B2 | 2/2011 | Hansen et al. | |
| 7,890,846 B2 | 2/2011 | Lee et al. | |
| 7,932,910 B2 | 4/2011 | Hansen et al. | |
| 7,933,905 B2 | 4/2011 | Obana et al. | |
| 7,940,712 B2 | 5/2011 | Larsson | |
| 7,952,587 B2 | 5/2011 | Hansen et al. | |
| 7,961,915 B2 | 6/2011 | Davida | |
| 7,962,540 B2 | 6/2011 | Michaels et al. | |
| 7,970,809 B2 | 6/2011 | Michaels et al. | |
| 7,984,361 B2 | 7/2011 | Ito | |
| 8,050,401 B2 | 11/2011 | Kohnen | |
| 8,051,362 B2 | 11/2011 | Li et al. | |
| 8,055,798 B2 * | 11/2011 | Wang | 709/246 |
| 8,078,944 B2 | 12/2011 | Cousins | |
| 8,107,620 B2 | 1/2012 | Jutla | |
| 8,131,794 B2 | 3/2012 | Ito | |
| 8,149,148 B1 | 4/2012 | Allen | |
| 8,150,031 B2 | 4/2012 | Gueron | |
| 8,150,264 B2 | 4/2012 | Tang et al. | |
| 8,150,750 B2 | 4/2012 | Ray | |
| 8,150,779 B1 | 4/2012 | Gauvin | |
| 8,150,808 B2 | 4/2012 | Zha et al. | |
| 8,150,912 B2 | 4/2012 | Rechterman | |
| 8,151,199 B2 | 4/2012 | Gerson et al. | |
| 8,155,146 B1 | 4/2012 | Vincent et al. | |
| 8,156,121 B2 | 4/2012 | Reese et al. | |
| 8,156,146 B2 | 4/2012 | Arthursson | |
| 8,156,406 B2 | 4/2012 | Edirisooriya et al. | |
| 8,159,974 B2 | 4/2012 | Monogioudis | |
| 8,160,879 B2 | 4/2012 | Czahor | |
| 8,161,060 B2 | 4/2012 | Frayman et al. | |
| 8,161,077 B2 | 4/2012 | Zha et al. | |
| 8,164,171 B2 | 4/2012 | Lin et al. | |
| 8,165,414 B1 | 4/2012 | Yagnik | |
| 8,170,971 B1 | 5/2012 | Wilson et al. | |
| 8,170,978 B1 | 5/2012 | Newstadt et al. | |
| 8,170,997 B2 | 5/2012 | Lomet et al. | |
| 8,171,110 B1 | 5/2012 | Parsons et al. | |
| 8,171,114 B1 | 5/2012 | Dale et al. | |
| 8,171,253 B2 | 5/2012 | Narayanasamy | |
| 8,171,390 B1 | 5/2012 | Channakeshava | |
| 8,171,504 B1 | 5/2012 | Protassov et al. | |
| 8,172,135 B1 | 5/2012 | Aidasani et al. | |
| 8,172,724 B2 | 5/2012 | Solomon | |
| 8,174,381 B2 | 5/2012 | Imes et al. | |
| 8,174,827 B2 | 5/2012 | Pan | |
| 8,175,617 B2 | 5/2012 | Rodriguez | |
| 8,175,972 B2 | 5/2012 | Galit et al. | |
| 8,176,094 B2 | 5/2012 | Friedman | |
| 8,176,509 B2 | 5/2012 | Folgner et al. | |
| 8,179,919 B2 | 5/2012 | Lin et al. | |
| 8,180,371 B1 | 5/2012 | Izdepski et al. | |
| 8,180,688 B2 | 5/2012 | Velummylum et al. | |
| 8,180,811 B2 | 5/2012 | Shyam et al. | |
| 8,180,851 B1 | 5/2012 | CaveLie | |
| 8,180,999 B1 | 5/2012 | Oakenfull | |
| 8,181,130 B1 | 5/2012 | Fender | |
| 8,181,250 B2 | 5/2012 | Rafalovich et al. | |
| 8,184,512 B2 | 5/2012 | Gagneraud et al. | |
| 8,185,444 B1 | 5/2012 | Basaraba | |
| 8,185,446 B1 | 5/2012 | Kuznetsova et al. | |
| 8,185,448 B1 | 5/2012 | Myslinski | |
| 8,185,501 B1 | 5/2012 | Cherukumudi et al. | |
| 8,185,624 B2 | 5/2012 | Pal et al. | |
| 8,189,225 B1 | 5/2012 | Lo et al. | |
| 8,189,283 B2 | 5/2012 | Colligan | |
| 8,190,693 B2 | 5/2012 | Bank et al. | |
| 8,190,740 B2 | 5/2012 | Stienhans et al. | |
| 8,285,681 B2 * | 10/2012 | Prahlad et al. | 707/640 |
| 8,341,141 B2 | 12/2012 | Krislov | |
| 8,463,765 B2 | 6/2013 | Lesavich | |
| 8,538,919 B1 * | 9/2013 | Nielsen et al. | 707/610 |
| 8,589,372 B2 | 11/2013 | Krislov | |
| 2004/0078410 A1 * | 4/2004 | Porten et al. | 708/492 |
| 2004/0236869 A1 | 11/2004 | Moon | |
| 2006/0159079 A1 | 7/2006 | Sachs | |
| 2006/0224760 A1 | 10/2006 | Yu | |
| 2008/0313241 A1 * | 12/2008 | Li et al. | 707/202 |
| 2010/0094878 A1 * | 4/2010 | Soroca et al. | 707/748 |
| 2010/0299580 A1 | 11/2010 | Neznanov et al. | |
| 2010/0303229 A1 | 12/2010 | Unruh | |
| 2010/0306293 A1 | 12/2010 | Li et al. | |
| 2010/0306627 A1 | 12/2010 | Sakai et al. | |
| 2010/0322342 A1 | 12/2010 | Josiam et al. | |
| 2010/0322411 A1 | 12/2010 | Lubberhuizen | |
| 2010/0322412 A1 | 12/2010 | Hung et al. | |
| 2010/0332944 A1 | 12/2010 | Cypher et al. | |
| 2010/0332945 A1 | 12/2010 | Cypher | |
| 2011/0004811 A1 | 1/2011 | Mourad et al. | |
| 2011/0010141 A1 | 1/2011 | Jabir | |
| 2011/0026601 A1 | 2/2011 | Mueller et al. | |
| 2011/0029845 A1 | 2/2011 | Zhou et al. | |
| 2011/0055662 A1 * | 3/2011 | Grube et al. | 714/763 |
| 2011/0055668 A1 | 3/2011 | Kim et al. | |
| 2011/0060782 A1 | 3/2011 | Moharil et al. | |
| 2011/0064214 A1 | 3/2011 | Lablans | |
| 2011/0126078 A1 | 5/2011 | Ueng et al. | |
| 2011/0131393 A1 | 6/2011 | Ramchandran et al. | |
| 2011/0145677 A1 | 6/2011 | Saxena et al. | |
| 2011/0149716 A1 | 6/2011 | Cho et al. | |
| 2011/0153701 A1 | 6/2011 | Moudgill | |
| 2011/0154155 A1 | 6/2011 | Abu-Surra et al. | |
| 2011/0158403 A1 | 6/2011 | Mathew et al. | |
| 2011/0172975 A1 | 7/2011 | Silva Filho | |
| 2011/0202280 A1 | 8/2011 | Sikora et al. | |
| 2011/0202587 A1 | 8/2011 | Chabot | |
| 2011/0202766 A1 | 8/2011 | Lerner | |
| 2011/0202815 A1 | 8/2011 | Toda | |
| 2011/0206087 A1 | 8/2011 | Picard | |
| 2011/0208710 A1 | 8/2011 | Lesavich | |
| 2011/0214031 A1 | 9/2011 | Chang et al. | |
| 2011/0219287 A1 | 9/2011 | Srinivas et al. | |
| 2011/0246548 A1 | 10/2011 | Yen | |
| 2011/0252286 A1 | 10/2011 | Li et al. | |
| 2011/0264857 A1 | 10/2011 | Delaney | |
| 2011/0289368 A1 | 11/2011 | Daga et al. | |
| 2011/0289381 A1 | 11/2011 | Daga et al. | |
| 2011/0293088 A1 | 12/2011 | Prouff et al. | |
| 2011/0295918 A1 | 12/2011 | Prouff et al. | |
| 2011/0307766 A1 | 12/2011 | Picchi et al. | |
| 2011/0311048 A1 | 12/2011 | Nagata et al. | |
| 2011/0320916 A1 | 12/2011 | Natuzzi et al. | |
| 2012/0020400 A1 | 1/2012 | Poloni et al. | |
| 2012/0030450 A1 | 2/2012 | Yu | |
| 2012/0042162 A1 * | 2/2012 | Anglin et al. | 713/165 |
| 2012/0054586 A1 | 3/2012 | Panteleev et al. | |
| 2012/0079178 A1 | 3/2012 | Litsyn et al. | |
| 2012/0079236 A1 | 3/2012 | Suvakovic et al. | |
| 2012/0089888 A1 | 4/2012 | Li et al. | |
| 2012/0102084 A1 | 4/2012 | Hiltunen et al. | |
| 2012/0102103 A1 | 4/2012 | Jacobson et al. | |
| 2012/0102154 A1 | 4/2012 | Huang et al. | |
| 2012/0102183 A1 | 4/2012 | Murakami et al. | |
| 2012/0102193 A1 | 4/2012 | Rathore et al. | |
| 2012/0102383 A1 | 4/2012 | Liu | |
| 2012/0102481 A1 | 4/2012 | Mani et al. | |
| 2012/0102486 A1 | 4/2012 | Yendluri | |
| 2012/0102498 A1 | 4/2012 | Subramanya et al. | |
| 2012/0102572 A1 | 4/2012 | Murakami et al. | |

(56) References Cited

U.S. PATENT DOCUMENTS

| | | |
|---|---|---|
| 2012/0109947 A1 | 5/2012 | Yu et al. |
| 2012/0110055 A1 | 5/2012 | Van Biljon et al. |
| 2012/0110056 A1 | 5/2012 | Van Biljon et al. |
| 2012/0110180 A1 | 5/2012 | Van Biljon et al. |
| 2012/0110185 A1 | 5/2012 | Ganesan et al. |
| 2012/0110186 A1 | 5/2012 | Kapur et al. |
| 2012/0110188 A1 | 5/2012 | Van Biljon et al. |
| 2012/0110394 A1 | 5/2012 | Murakami et al. |
| 2012/0110570 A1 | 5/2012 | Jacobson et al. |
| 2012/0110636 A1 | 5/2012 | Van Biljon et al. |
| 2012/0110650 A1 | 5/2012 | Van Biljon et al. |
| 2012/0110651 A1 | 5/2012 | Van Biljon et al. |
| 2012/0116743 A1 | 5/2012 | Ayala et al. |
| 2012/0116782 A1 | 5/2012 | Punnoose et al. |
| 2012/0116937 A1 | 5/2012 | Van Biljon et al. |
| 2012/0117142 A1 | 5/2012 | Lu |
| 2012/0117158 A1 | 5/2012 | Cummings |
| 2012/0117229 A1 | 5/2012 | Van Biljon et al. |
| 2012/0117422 A1 | 5/2012 | Radhakrishnan |
| 2012/0117441 A1 | 5/2012 | Hansen et al. |
| 2012/0117559 A1 | 5/2012 | Vorthmann et al. |
| 2012/0117563 A1 | 5/2012 | Chang et al. |
| 2012/0120814 A1 | 5/2012 | Chetlur et al. |
| 2012/0121084 A1 | 5/2012 | Tomlinson et al. |
| 2012/0123886 A1 | 5/2012 | Brown et al. |
| 2012/0123898 A1 | 5/2012 | Kirkeby et al. |
| 2012/0124128 A1 | 5/2012 | Vonog et al. |
| 2012/0124211 A1 | 5/2012 | Kampas et al. |
| 2012/0124666 A1 | 5/2012 | Kim et al. |
| 2012/0127183 A1 | 5/2012 | Vonog et al. |
| 2012/0129607 A1 | 5/2012 | Jabara et al. |
| 2012/0130702 A1 | 5/2012 | Citron et al. |
| 2012/0130955 A1 | 5/2012 | Li |
| 2012/0131075 A1 | 5/2012 | Mawdsley et al. |
| 2012/0131144 A1 | 5/2012 | Cooper et al. |
| 2012/0131172 A1 | 5/2012 | Falk et al. |
| 2012/0131220 A1 | 5/2012 | Broding et al. |
| 2012/0131381 A1 | 5/2012 | Eleftheriou et al. |
| 2012/0131555 A1 | 5/2012 | Hossain et al. |
| 2012/0131567 A1 | 5/2012 | Barros et al. |
| 2012/0131572 A1 | 5/2012 | Shae et al. |
| 2012/0137001 A1 | 5/2012 | Ferris et al. |
| 2012/0137003 A1 | 5/2012 | Ferris et al. |
| 2014/0081932 A1 | 3/2014 | Krislov |
| 2014/0189792 A1 | 7/2014 | Lesavich et al. |

* cited by examiner

FIG. 8C

THE FIRST CLOUD APPLICATION ON THE CLOUD SERVER NETWORK DEVICE SECURELY SENDS IN REAL-TIME THE FINAL DESIRED CLOUD ELECTRONIC CONTENT COMPONENT AS THE REQUEST DESIRED CLOUD ELECTRONIC CONTENT TO THE TARGET NETWORK DEVICE VIA THE CLOUD COMMUNICATIONS NETWORK. THE SECOND CLOUD APPLICATION ON THE TARGET NETWORK DEVICE CANNOT DETERMINE THE DESIRED CLOUD ELECTRONIC CONTENT WAS SPLIT AND WAS STORED IN PLURAL CLOUD STORAGE OBJECTS AND CANNOT DETERMINE WHICH OF PLURAL SELECTED ONES OF THE OTHER DIFFERENT CLOUD SERVER NETWORK DEVICES ON WHICH ONES OF THE PUBLIC, PRIVATE, COMMUNITY OR HYBRID NETWORKS ON THE CLOUD COMMUNICATIONS NETWORK MAY HAVE STORED PORTIONS OF THE FINAL DESIRED CLOUD ELECTRONIC CONTENT, THEREBY PROVIDING A SECOND LAYER OF SECURITY AND PRIVACY FOR THE DESIRED CLOUD ELECTRONIC CONTENT ON THE CLOUD COMMUNICATIONS NETWORK — 130

START

THE FIRST CLOUD APPLICATION ON THE CLOUD SERVER NETWORK DEVICE SENDS PLURAL THIRD REQUEST MESSAGES TO THE SELECTED ONES OF THE PLURAL OTHER DIFFERENT CLOUD SERVER NETWORK DEVICES IDENTIFIED IN THE RETRIEVED CLOUD CONTENT LOCATION MAP TO DE-ACTIVATE THE PLURAL PORTIONS OF DESIRED CLOUD ELECTRONIC CONTENT STORED IN THE PLURAL CLOUD STORAGE OBJECTS STORED ON THE SELECTED ONES OF THE PLURAL OTHER DIFFERENT CLOUD SERVER NETWORK DEVICES — 134

THE FIRST CLOUD APPLICATION DETERMINES NEW PLURAL ADDRESS LOCATIONS OF NEW SELECTED ONES OF PLURAL OTHER DIFFERENT CLOUD SERVER NETWORK DEVICES EACH WITH ONE OR MORE PROCESSORS WITH THE GALOIS FIELD — 136

THE FIRST CLOUD APPLICATION SECURELY STORES THE DETERMINED NEW PLURAL ADDRESS LOCATIONS IN THE CLOUD CONTENT LOCATION MAP WITH THE FIRST CLOUD APPLICATION IN THE FIRST NON-TRANSITORY COMPUTER READABLE MEDIUM ON THE CLOUD SERVER NETWORK DEVICE — 138

THE FIRST CLOUD APPLICATION SECURELY SEND THE RETRIEVED PLURAL CLOUD STORAGE OBJECTS TO THE NEW DETERMINED SELECTED ONES OF THE PLURAL OTHER DIFFERENT CLOUD SERVERS ON THE CLOUD COMMUNICATIONS NETWORK WITH THE DETERMINED PLURAL ADDRESS LOCATIONS. THE PLURAL CLOUD STORAGE OBJECTS ARE DISTRIBUTED AND LOCATED IN A NEW PLURAL DIFFERENT LOCATIONS ON ONE OR MORE PUBLIC, PRIVATE, COMMUNITY OR HYBRID NETWORKS ON THE CLOUD COMMUNICATIONS NETWORK — 140

END

METHOD AND SYSTEM FOR ELECTRONIC CONTENT STORAGE AND RETRIEVAL WITH GALOIS FIELDS ON CLOUD COMPUTING NETWORKS

CROSS REFERENCES TO RELATED APPLICATIONS

This application is a Continuation-In-Part (CIP) of U.S. Utility application Ser. No. 13/097,227 filed Apr. 29, 2011, the contents of which is incorporated by reference.

FIELD OF INVENTION

This invention relates to retrieving electronic information over a computer network. More specifically, it relates to a method and system for electronic content storage and retrieval with Galois fields on cloud computing networks.

BACKGROUND OF THE INVENTION

"Cloud computing" is a term used to identify the delivery of computing requirements as a service to a heterogeneous community of end-recipients. The term cloud theoretically signifies abstraction of technology, resources and locations that are used in building an integrated computing infrastructure (including networks, systems, applications, etc.). All Cloud computing models rely heavily on sharing of resources to achieve coherence and economies of scale similar to a utility (like a grid for electricity) over a network.

Cloud computing provides services with a user's data, software and computation on over multiple networks. End users access cloud based applications through a web browser or a light weight desktop or mobile application while the rest of the application software and data are stored on servers at remote locations. Cloud computing provides a same or better service and performance with cloud software programs as if al the cloud software programs were actually installed locally on end-user devices.

At the foundation of cloud computing is the broader concept of infrastructure convergence and shared services. This type of cloud computing environment allows enterprises to get their applications up and running faster, with easier manageability and less maintenance, and enables the enterprise to more rapidly adjust resources (such as servers, storage, and networking) to meet fluctuating and unpredictable business demand.

However, there are a number of problems associated with electronic content storage and retrieval on cloud computing network.

One problem is how to efficiently store and retrieve electronic content on cloud computing networks.

Another problem is providing proper privacy and security for electronic content stored and retrieved on cloud computing networks.

Another problem is where to store and retrieve electronic content on a cloud computing network.

Thus, it is desirable to solve some of the problems associated with content storage and retrieval with cloud computing networks.

SUMMARY OF THE INVENTION

In accordance with preferred embodiments of the present invention, some of the problems associated with electronic content storage and retrieval on cloud computing networks are overcome. A method and system for electronic content storage and retrieval on cloud computing networks is presented.

The electronic content is divided into plural portions and stored in plural cloud storage objects. Storage locations for the plural cloud storage objects are selected using a Galois field and the plural cloud storage objects are distributed to various locations across the cloud network. When the electronic content is requested, the plural portions are retrieved and transparently combined back into the original electronic content. No server network devices storing the plural cloud storage objects can individually determine locations of all portions of the electronic content on the cloud communications network, thereby providing a first layer of security and privacy for the electronic content on the cloud communications network. No target network devices requesting the electronic content can determine where the electronic content is stored, thereby providing a second layer of security and privacy for the electronic content on the cloud communications network.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIGS. 8A, 8B and 8C are a flow diagram illustrating a method for providing electronic content retrieval with cloud computing; and FIG. 9 is a flow diagram illustrating a method for storing electronic content with cloud computing.

DETAILED DESCRIPTION OF THE INVENTION

Exemplary cloud electronic information storage and retrieval system

Figure 1:
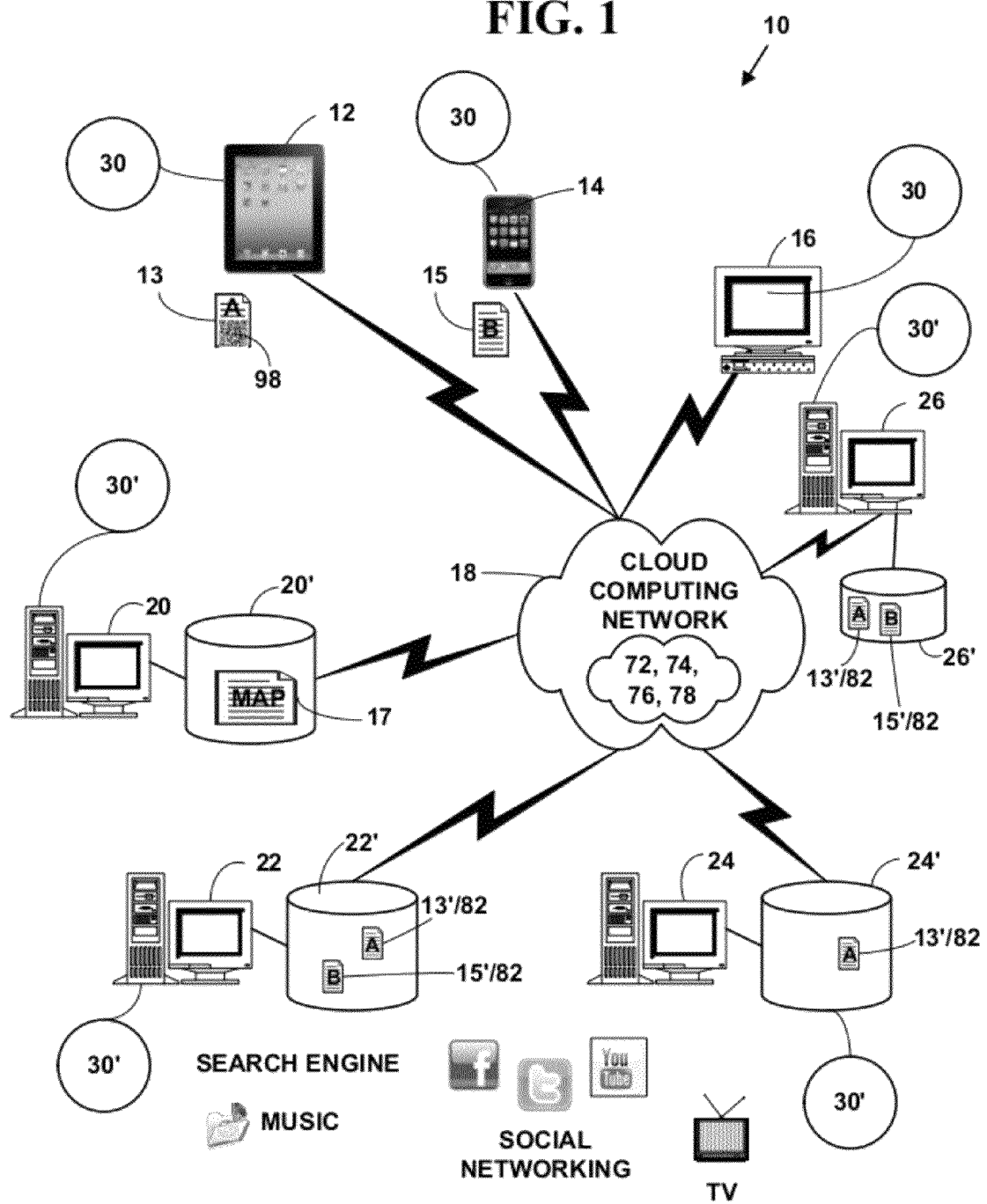
FIG. 1 is a block diagram illustrating an exemplary electronic information display system.

FIG. 1 is a block diagram illustrating an exemplary electronic information system 10. The exemplary electronic system 10 includes, but is not limited to, one or more target network devices 12, 14, 16 (only three of which are illustrated) each with one or more processors and each with a non-transitory computer readable medium.

The one or more target network devices 12, 14, 16 include, but are not limited to, multimedia capable desktop and laptop computers, tablet computers, facsimile machines, mobile phones, non-mobile phones, smart phones, Internet phones, Internet appliances, personal digital/data assistants (PDA), two-way pagers, digital cameras, portable game consoles (Play Station Portable by Sony, Game Boy by Sony, Nintendo DSI, etc.), non-portable game consoles (Xbox by Microsoft, Play Station by Sony, Wii by Nintendo, etc.), cable television (CATV), satellite television (SATV) and Internet television set-top boxes, digital televisions including high definition television (HDTV), three-dimensional (3DTV) televisions and other types of network devices.

The one or more smart network devices 12, 14, 16 include smart phones such as the iPhone by Apple, Inc., Blackberry Storm and other Blackberry models by Research In Motion, Inc. (RIM), Droid by Motorola, Inc. HTC, Inc. other types of smart phones, etc. However, the present invention is not limited to such smart phone devices, and more, fewer or other devices can be used to practice the invention.

A "smart phone" is a mobile phone that offers more advanced computing ability and connectivity than a contemporary basic feature phone. Smart phones and feature phones may be thought of as handheld computers integrated with a mobile telephone, but while most feature phones are able to run applications based on platforms such as Java ME, a smart phone usually allows the user to install and run more advanced applications. Smart phones and/or tablet computers run complete operating system software providing a platform for application developers.

The operating systems include the iPhone OS, Android, Windows, etc. iPhone OS is a proprietary operating system for the Apple iPhone. Android is an open source operating system platform backed by Google, along with major hardware and software developers (such as Intel, HTC, ARM, Motorola and Samsung, etc.), that form the Open Handset Alliance.

The one or more smart network devices 12, 14, 16 include tablet computers such as the iPad, by Apple, Inc., the HP Tablet, by Hewlett Packard, Inc., the Playbook, by RIM, Inc., the Tablet, by Sony, Inc.

The target network devices 12, 14, 16 are in communications with a cloud communications network 18 via one or more wired and/or wireless communications interfaces. The cloud communications network 18, is also called a "cloud computing network" herein and the terms may be used interchangeably.

The plural target network devices 12, 14, 16 request desired electronic content 13, 15, etc. stored on the cloud communications network 18.

The cloud communications network 18 includes, but is not limited to, communications over a wire connected to the target network devices, wireless communications, and other types of communications using one or more communications and/or networking protocols.

Plural server network devices 20, 22, 24, 26 (only four of which are illustrated) each with one or more processors and a non-transitory computer readable medium include one or more associated databases 20', 22', 24', 26'. The plural network devices 20, 22, 24, 26 are in communications with the one or more target devices 12, 14, 16 via the cloud communications network 18.

Plural server network devices 20, 22, 24, 26 (only four of which are illustrated) are physically located on one more public networks 76 (See FIG. 4), private networks 72, community networks 74 and/or hybrid networks 78 comprising the cloud network 18.

One or more server network devices (e.g., 20, etc.) securely stores a cloud content location map 17 and other plural server network devices (e.g., 22, 24, 26, etc.) store portions 13', 15' of desired electronic content 13, 15 as cloud storage objects 82 (FIG. 5) as is described herein.

The plural server network devices 20, 22, 24 26, include, but are not limited to, World Wide Web servers, Internet servers, search engine servers, vertical search engine servers, social networking site servers, file servers, other types of electronic information servers, and other types of server network devices (e.g., edge servers, firewalls, routers, gateways, etc.).

The plural server network devices 20, 22, 24, 26 also include, but are not limited to, network servers used for cloud computing providers, etc.

The cloud communications network 18 includes, but is not limited to, a wired and/or wireless communications network comprising one or more portions of: the Internet, an intranet, a Local Area Network (LAN), a wireless LAN (WiLAN), a Wide Area Network (WAN), a Metropolitan Area Network (MAN), a Public Switched Telephone Network (PSTN), a Wireless Personal Area Network (WPAN) and other types of wired and/or wireless communications networks 18.

The cloud communications network 18 includes one or more gateways, routers, bridges and/or switches. A gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments based on some pre-determined sequence (e.g., timing, sequence number, etc.).

An operating environment for the network devices of the exemplary electronic information display system 10 include a processing system with one or more high speed Central Processing Unit(s) (CPU), processors, one or more memories and/or other types of non-transitory computer readable mediums. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical information by the CPU or processor. An electrical system represents data bits which cause a resulting transformation or reduction of the electrical information or biological information, and the maintenance of data bits at memory locations in a memory system to thereby reconfigure or otherwise alter the CPU's or processor's operation, as well as other processing of information. The memory locations where data bits are maintained are physical locations that have particular electrical, magnetic, optical, or organic properties corresponding to the data bits.

The data bits may also be maintained on a non-transitory computer readable medium including magnetic disks, optical disks, organic memory, and any other volatile (e.g., Random Access Memory (RAM)) or non-volatile (e.g., Read-Only Memory (ROM), flash memory, etc.) mass storage system readable by the CPU. The non-transitory computer readable medium includes cooperating or interconnected computer readable medium, which exist exclusively on the processing system or can be distributed among multiple interconnected processing systems that may be local or remote to the processing system.

Exemplary Electronic Content Display System

Figure 2:
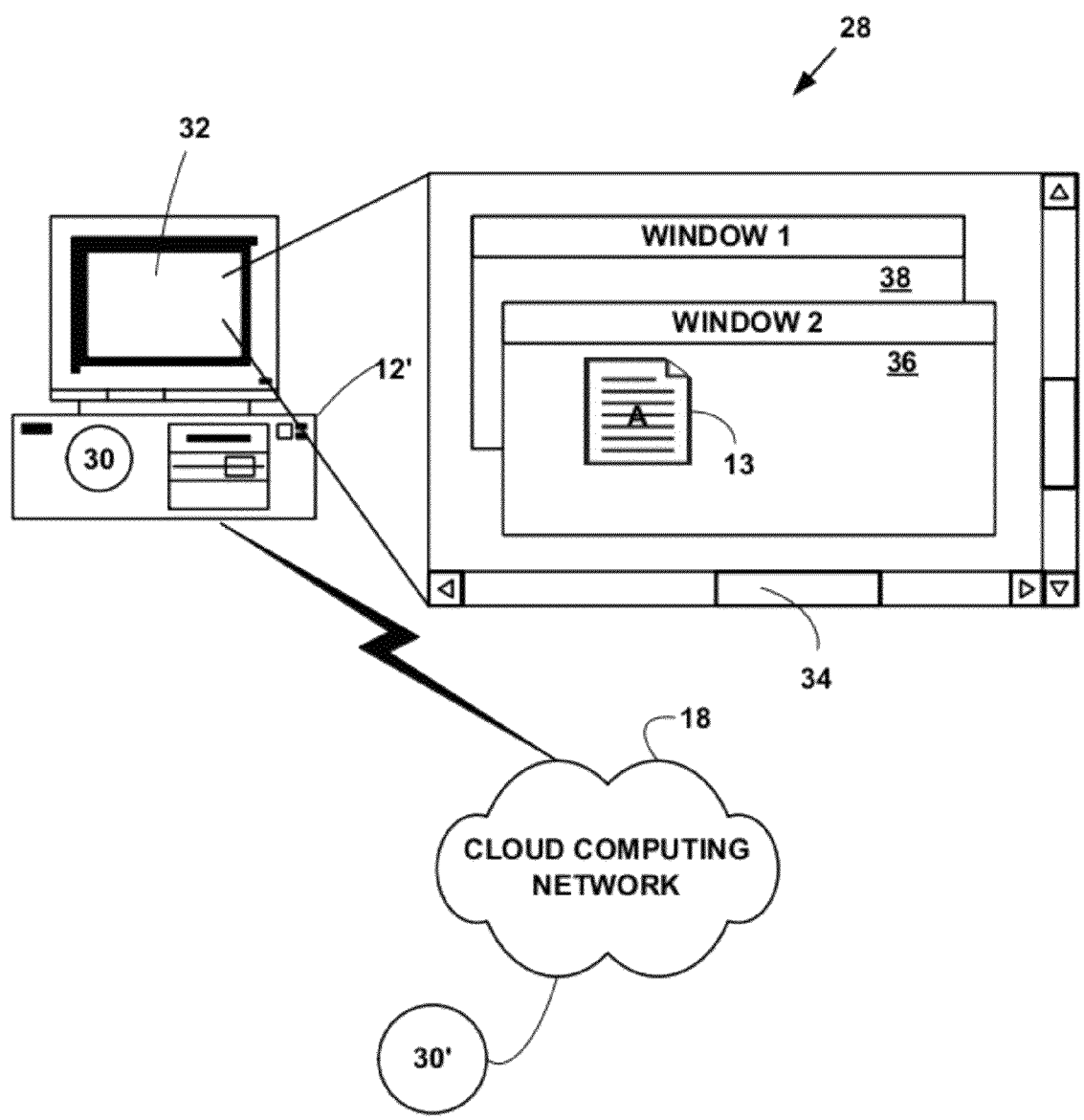
FIG. 2 is a block diagram illustrating an exemplary electronic information display system.

FIG. 2 is a block diagram illustrating an exemplary electronic content information display system 28. The exemplary electronic information system display system includes, but is not limited to a target network device (e.g., 12, etc.) with a cloud application 30 and a display component 32. The cloud application 30 presents a graphical user interface (GUI) 34 on the display 32 component. The GUI 32 presents a multi-window 36, 38, etc. (only two of which are illustrated) interface to a user.

In one embodiment of the invention, the cloud application 30 is a software application. However, the present invention is not limited to this embodiment and the cloud application 30 can be hardware, firmware, hardware and/or any combination thereof. However, the present invention is not limited these embodiments and other embodiments can be used to practice the invention In another embodiment, a portion of the cloud application 30 is executing on the target network devices 12, 14, 16 and another portion of the application 30' is executing on the server network devices 20, 22, 24, 26 However, the present invention is not limited these embodiments and other embodiments can be used to practice the invention.

Exemplary Networking Protocol Stack

Figure 3:
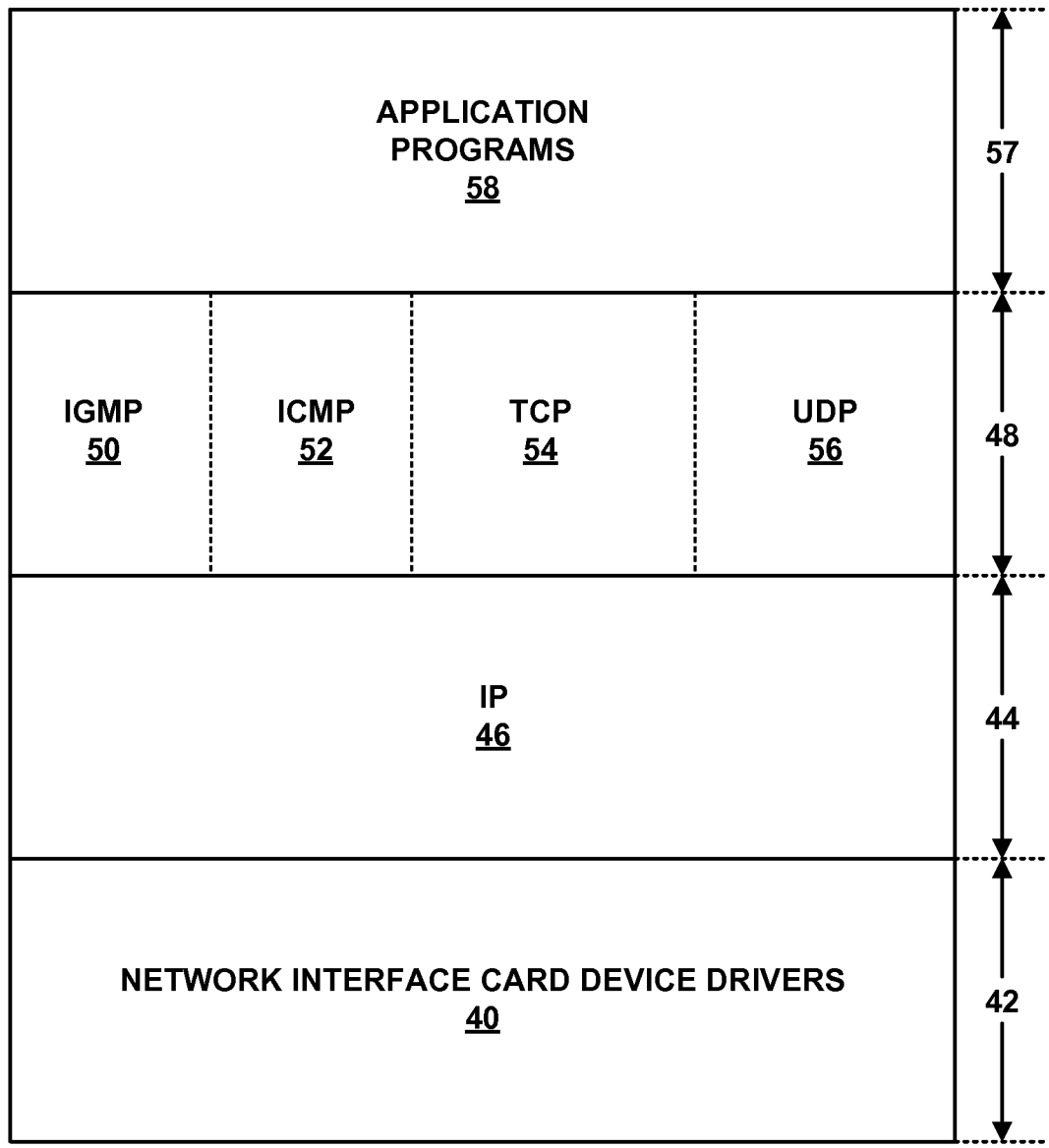
FIG. 3 is a block diagram illustrating an exemplary networking protocol stack.

FIG. 3 a block diagram illustrating a layered protocol stack 38 for network devices in the electronic information display system 10. The layered protocol stack 38 is described with respect to Internet Protocol (IP) suites comprising in general from lowest-to-highest, a link 42, network 44, transport 48 and application 57 layer. However, more or fewer layers could also be used, and different layer designations could also be used for the layers in the protocol stack 38 (e.g., layering based on the Open Systems Interconnection (OSI) model including from lowest-to-highest, a physical, data-link, network, transport, session, presentation and application layer.).

The network devices 12, 14, 16, 20, 22, 24, 26 are connected to the communication network 18 with Network Interface Card (NIC) cards including device drivers 40 in a link layer 42 for the actual hardware connecting the network devices 12, 14, 16, 20, 22, 24, 26 to the cloud communications network 18. For example, the NIC device drivers 40 may include a serial port device driver, a digital subscriber line (DSL) device driver, an Ethernet device driver, a wireless device driver, a wired device driver, etc. The device drivers interface with the actual hardware being used to connect the network devices to the cloud communications network 18. The NIC cards have a medium access control (MAC) address that is unique to each NIC and unique across the whole cloud network 18. The Medium Access Control (MAC) protocol is used to provide a data link layer of an Ethernet LAN system and for other network systems.

Above the link layer 42 is a network layer 44 (also called the Internet Layer for Internet Protocol (IP) suites). The network layer 44 includes, but is not limited to, an IP layer 46.

IP 46 is an addressing protocol designed to route traffic within a network or between networks. However, more fewer or other protocols can also be used in the network layer 44, and the present invention is not limited to IP 46. For more information on IP 46 see IETF RFC-791, incorporated herein by reference.

Above network layer 44 is a transport layer 48. The transport layer 48 includes, but is not limited to, an optional Internet Group Management Protocol (IGMP) layer 50, a Internet Control Message Protocol (ICMP) layer 52, a Transmission Control Protocol (TCP) layer 52 and a User Datagram Protocol (UDP) layer 54. However, more, fewer or other protocols could also be used in the transport layer 48.

Optional IGMP layer 50, hereinafter IGMP 50, is responsible for multicasting. For more information on IGMP 50 see RFC-1112, incorporated herein by reference. ICMP layer 52, hereinafter ICMP 52 is used for IP 46 control. The main functions of ICMP 52 include error reporting, reachability testing (e.g., pinging, etc.), route-change notification, performance, subnet addressing and other maintenance. For more information on ICMP 52 see RFC-792, incorporated herein by reference. Both IGMP 50 and ICMP 52 are not required in the protocol stack 38. ICMP 52 can be used alone without optional IGMP layer 50.

TCP layer 54, hereinafter TCP 54, provides a connection-oriented, end-to-end reliable protocol designed to fit into a layered hierarchy of protocols which support multi-network applications. TCP 54 provides for reliable inter-process communication between pairs of processes in network devices attached to distinct but interconnected networks. For more information on TCP 54 see RFC-793, incorporated herein by reference.

UDP layer 56, hereinafter UDP 56, provides a connectionless mode of communications with datagrams in an interconnected set of computer networks. UDP 56 provides a transaction oriented datagram protocol, where delivery and duplicate packet protection are not guaranteed. For more information on UDP 56 see RFC-768, incorporated herein by reference. Both TCP 54 and UDP 56 are not required in protocol stack 38. Either TCP 54 or UDP 56 can be used without the other.

Above transport layer 48 is an application layer 57 where application programs 58 (e.g., 30, 30', etc.) to carry out desired functionality for a network device reside. For example, the application programs 58 for the client network devices 12, 14, 16 may include a web-browsers or other application programs, cloud application program 30, while application programs for the server network devices 20, 22, 24, 26 may include other application programs (e.g., 30', etc.).

However, the protocol stack 38 is not limited to the protocol layers illustrated and more, fewer or other layers and protocols can also be used in protocol stack 38. In addition, other protocols from the Internet Protocol suites (e.g., Simple Mail Transfer Protocol, (SMTP), Hyper Text Transfer Protocol (HTTP), File Transfer Protocol (FTP), Dynamic Host Configuration Protocol (DHCP), DNS, etc.) and/or other protocols from other protocol suites may also be used in protocol stack 38.

Preferred embodiments of the present invention include network devices and wired and wireless interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Bluetooth Forum, or the ADSL Forum. However, network devices based on other standards could also be used. IEEE standards can be found on the World Wide Web at the Universal Resource Locator (domain name) "www.ieee.org." The ITU, (formerly known as the CCITT) standards can be found at the domain name "www.itu.ch." ETSI standards can be found at the domain name "www.etsi.org." IETF standards can be found at the domain name "www.ietf.org." The NIST standards can be found at the domain name "www.nist.gov." The ANSI standards can be found at the domain name "www.ansi.org." Bluetooth Forum documents can be found at the domain name "www.bluetooth.com." WAP Forum documents can be found at the domain name "www.wapforum.org." ADSL Forum documents can be found at the domain name "www.adsl.com."

Wireless Interfaces

In one embodiment of the present invention, the wireless interfaces on network devices 12, 14, 16, 20, 22, 24, 26 include but are not limited to, 3G and/or 4G IEEE 802.11a, 802.11b, 802.11g, 802.11n, 802.15.4 (ZigBee), "Wireless Fidelity" (Wi-Fi), "Worldwide Interoperability for Microwave Access" (WiMAX), ETSI High Performance Radio Metropolitan Area Network (HIPERMAN) or "RF Home" wireless interfaces. In another embodiment of the present invention, the wireless sensor device may include an integral or separate Bluetooth and/or infra data association (IrDA) module for wireless Bluetooth or wireless infrared communications. However, the present invention is not limited to such an embodiment and other 802.11xx and other types of wireless interfaces can also be used.

802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54 Mbps. 802.11g deliver speeds on par with 802.11a. However, other 802.11XX interfaces can also be used and the present invention is not limited to the 802.11 protocols defined. The IEEE 802.11a, 802.11b and 802.11g standards are incorporated herein by reference.

Wi-Fi is a type of 802.11xx interface, whether 802.11b, 802.11a, dual-band, etc. Wi-Fi devices include an RF interfaces such as 2.4 GHz for 802.11b or 802.11g and 5 GHz for 802.11a. More information on Wi-Fi can be found at the domain name www.weca.net.

802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference. More information on 802.15.4 and ZigBee can be found at the domain name "www.ieee802.org" and "www.zigbee.org" respectively.

WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the domain name "www.wimaxforum.org." WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the domain name "www.etsi.org." ETSI HIPERMAN can be used to provide a WLP.

In one embodiment, the plural server network devices 20, 22, 24, 26 include a connection to plural network interface cards (NICs) in a backplane connected to a communications bus. The NIC cards provide gigabit/second ($1 \times 10^9$ bits/second) communications speed of electronic information. This allows "scaling out" for fast electronic content retrieval. The NICs are connected to the plural server network devices 20, 22, 24, 26 and the cloud communications network 18. However, the present invention is not limited to the NICs described and other types of NICs in other configurations and connections with and/or without a buses can also be used to practice the invention.

In one embodiment, network devices 12, 14, 16, 20, 22, 24, 26 and wired and wireless interfaces including the NICs include "4G" components. "4G" refers to the fourth generation of wireless communications standards and speeds of 100 megabits/second to gigabits/second or more. 4G includes peak speed requirements for 4G service at least 100 Mbit/s for high mobility communication (e.g., trains, vehicles, etc.) and 1 Gbit/s for low mobility communication (e.g., pedestrians and stationary users, etc.).

4G technologies are a successor to 3G and 2G standards. The nomenclature of the generations generally refers to a change in the fundamental nature of the service. The first was the move from analogue (1G) to digital (2G) transmission. This was followed by multi-media support, spread spectrum transmission and at least 200 kbits/second (3G). The 4G NICs include IP packet-switched NICs, wired and wireless ultra-broadband (i.e., gigabit speed) access NICs, Worldwide Interoperability for Microwave Access (WiMAX) NICs WiMAX Long Term Evolution (LTE) and/or multi-carrier transmission NICs. However, the present invention is not limited to this embodiment and 1G, 2G and 3G and/or any combination thereof, with or with 4G NICs can be used to practice the invention.

In one embodiment of the invention, the WiMAX interfaces includes WiMAX 4G Long Term Evolution (LTE) interfaces. The ITU announced in December 2010 that WiMAX and LTE are 4G technologies. One of the benefits of 4G LTE is the ability to take advantage of advanced topology networks including those on cloud communications networks 18 such as optimized heterogeneous networks with a mix of macrocells with low power nodes such as picocells, femtocells and new relay nodes. LTE further improves the capacity and coverage, and helps ensures user fairness. 4G LTE also introduces multicarrier technologies for ultra-wide bandwidth use, up to 100 MHz of spectrum supporting very high data rates.

In one embodiment, of the invention, the wireless interfaces also include wireless personal area network (WPAN) interfaces. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, smart phone, table computer two-way pager, etc.)

A key concept in WPAN technology is known as "plugging in." In the ideal scenario, when any two WPAN-equipped devices come into close proximity (within several meters and/or feet of each other) or within a few miles and/or kilometers of a central server (not illustrated), they can communicate via wireless communications as if connected by a cable. WPAN devices can also lock out other devices selectively, preventing needless interference or unauthorized access to secure information. Zigbee is one wireless protocol used on WPAN networks such as cloud communications network 18.

However, the present invention is not limited to such wireless interfaces and wireless networks and more, fewer and/or other wireless interfaces can be used to practice the invention.
Wired Interfaces In one embodiment of the present invention, the wired interfaces include wired interfaces and corresponding networking protocols for wired connections to the Public Switched Telephone Network (PSTN) and/or a cable television network (CATV) and/or satellite television networks (SATV) and/or three-dimensional television (3DTV), including HDTV that connect the network devices 12, 14, 16, 20, 22, 24, 26 via one or more twisted pairs of copper wires, digital subscriber lines (e.g. DSL, ADSL, VDSL, etc.) coaxial cable, fiber optic cable, other connection media or other connection interfaces. The PSTN is any public switched telephone network provided by AT&T, GTE, Sprint, MCI, SBC, Verizon and others. The CATV is any cable television network provided by the Comcast, Time Warner, etc. However, the present invention is not limited to such wired interfaces and more, fewer and/or other wired interfaces can be used to practice the invention.
Television Services In one embodiment, the cloud applications 30, 30' provide cloud electronic content storage and retrieval services from television services over the cloud communications network 18. The television services include digital television services, including, but not limited to, cable television, satellite television, high-definition television, three-dimensional, televisions and other types of network devices.

However, the present invention is not limited to such television services and more, fewer and/or other television services can be used to practice the invention.
Internet Television Services In one embodiment, the cloud applications 30, 30' provide cloud electronic content storage and retrieval services from Internet television services over the cloud communications network 18. The television services include Internet television, Web-TV, and/or Internet Protocol Television (IPtv) and/or other broadcast television services.

"Internet television" allows users to choose a program or the television show they want to watch from an archive of programs or from a channel directory. The two forms of viewing Internet television are streaming content directly to a media player or simply downloading a program to a viewer's set-top box, game console, computer, or other mesh network device.

"Web-TV" delivers digital content via non-mesh broadband and mobile networks. The digital content is streamed to a viewer's set-top box, game console, computer, or other mesh network device.

"Internet Protocol television (IPtv)" is a system through which Internet television services are delivered using the architecture and networking methods of the Internet Protocol Suite over a packet-switched network infrastructure, e.g., the Internet and broadband Internet access networks, instead of being delivered through traditional radio frequency broadcast, satellite signal, and cable television formats.

However, the present invention is not limited to such Internet Television services and more, fewer and/or other Internet Television services can be used to practice the invention.
General Search Engine Services In one embodiment, the cloud applications 30, 30' provide cloud electronic content storage and retrieval services from general search engine services. A search engine is designed to search for information on a cloud communications network 18 such as the Internet including World Wide Web servers, HTTP, FTP servers etc. The search results are generally presented in a list of electronic results. The information may consist of web pages, images, electronic information, multimedia information, and other types of files. Some search engines also mine data available in databases or open directories. Unlike web directories, which are maintained by human editors, search engines typically operate algorithmically and/or are a mixture of algorithmic and human input.

In one embodiment, the cloud applications 30, 30' provide cloud electronic content storage and retrieval services from general search engine services. In another embodiment, the cloud applications 30, 30' provide general search engine services by interacting with one or more other public search engines (e.g., GOOGLE, BING, YAHOO, etc.) and/or private search engine services.

In another embodiment, the cloud applications 30, 30' provide electronic content storage and retrieval services from specialized search engine services, such as vertical search engine services by interacting with one or more other public vertical search engines (e.g., GALAXY.COM, etc.) and/or private search engine services However, the present invention is not limited to such general and/or vertical search engine services and more, fewer and/or other general search engine services can be used to practice the invention.
Social Networking Services In one embodiment, the cloud applications 30, 30' provide cloud electronic content storage and retrieval services from one more social networking services including to/from one or more social networking web-sites (e.g., FACEBOOK, U-TUBE, TWITTER, MY-SPACE, MATCH.COM, E-HARMONY, GROUP ON, SOCIAL LIVING, etc.). The social networking web-sites also include, but are not limited to, social couponing sites, dating web-sites, blogs, RSS feeds, and other types of information web-sites in which messages can be left or posted for a variety of social activities.

However, the present invention is not limited to the social networking services described and other public and private social networking services can also be used to practice the invention.
Music Downloading Services In one embodiment, the cloud applications 30, 30' provide cloud electronic content storage and retrieval services from one more music downloading services (e.g., iTunes, Rhapsody, etc.) at one or more music downloading sites.

However, the present invention is not limited to the social networking services described and other public and private social networking services can also be used to practice the invention.

Security and Encryption

Network devices 12, 14, 16, 20, 22, 24, 26 with wired and/or wireless interfaces of the present invention include one or more of the security and encryptions techniques discussed herein for secure communications on the cloud communications network 18.

Application programs 58 (FIG. 2) include security and/or encryption application programs integral to and/or separate from the cloud applications 30, 30' Security and/or encryption programs may also exist in hardware components on the network devices (12, 14, 16, 20, 22, 24, 26) described herein and/or exist in a combination of hardware, software and/or firmware.

Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES). More information on NIST AES can be found at the domain name "www.nist.gov/aes."

DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

"Hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

Providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

An Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

The HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

The SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security method are negotiated between the source and destination at the start of establishing a protocol session. The SSL 2.0 protocol specification, by Kipp E. B. Hickman, 1995 is incorporated herein by reference. More information on SSL is available at the domain name See "netscape.com/eng/security/SSL_2.html."

Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, Calif. is supplier of networking hardware and software, including router and security products.

"Integrated Encryption Scheme (IES)" is a hybrid encryption scheme which provides semantic security against an adversary who is allowed to use chosen-plaintext and chosen-ciphertext attacks. The security of the scheme is based on the Diffie-Hellman problem. Two incarnations of the IES are standardized: Discrete Logarithm Integrated Encryption Scheme (DLIES) and Elliptic Curve Integrated Encryption Scheme (ECIES), which is also known as the Elliptic Curve Augmented Encryption Scheme or simply the Elliptic Curve Encryption Scheme. For more information, see *Standards for efficient cryptography*, SEC 1: Elliptic Curve Cryptography, Version 2.0, May 21, 2009, the contents of which are incorporated by reference.

"Homomorphic encryption" is a form of encryption where a specific algebraic operation performed on the plaintext is equivalent to another (possibly different) algebraic operation performed on the ciphertext. Homomorphic encryption schemes are malleable by design. The homomorphic property of various cryptosystems is used with cloud computing by ensuring the confidentiality of processed data. The "homomorphic" part of a fully homomorphic encryption scheme can also be described in terms of category theory. If C is the category whose objects are integers (i.e., finite streams of data) and whose morphisms are computable functions, then (ideally) a fully homomorphic encryption scheme elevates an encryption function to a functor from C to itself.

However, the present invention is not limited to such security and encryption methods described herein and more, fewer and/or other types of security and encryption methods can be used to practice the invention. The security and encryption methods described herein can also be used in various combinations and/or in different layers of the protocol stack 38 with each other.

Cloud Computing Networks

Figure 4:
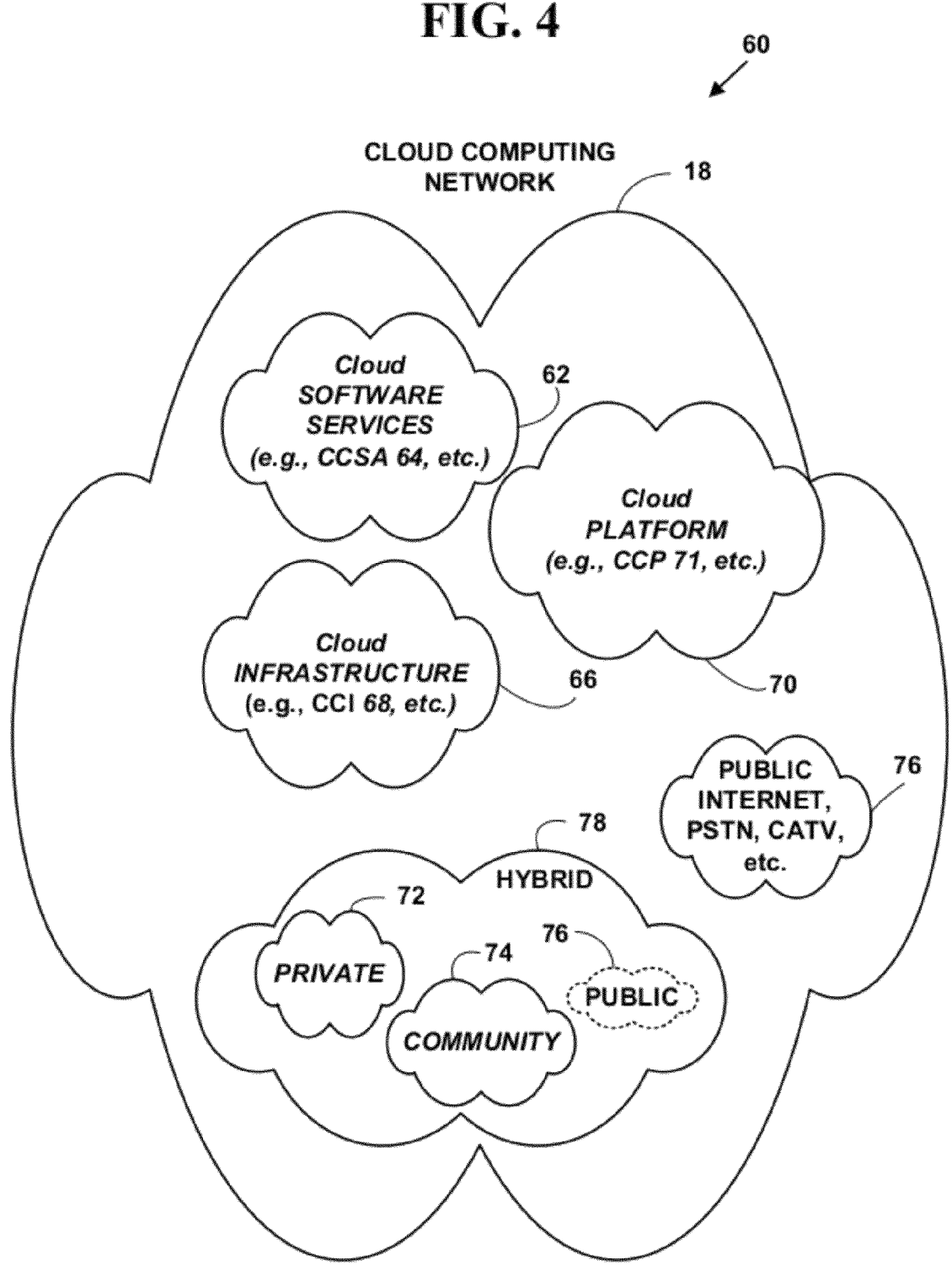
FIG. 4 is block diagram illustrating an exemplary cloud communications network.

FIG. 4 is a block diagram 60 illustrating an exemplary cloud computing network 18. The cloud computing network 18 is also referred to as a "cloud communications network" 18. However, the present invention is not limited to this cloud computing model and other cloud computing models can also be used to practice the invention. The exemplary cloud communications network includes both wired and/or wireless components of public and private networks.

In one embodiment, the cloud computing network 18 includes a cloud communications network 18 comprising plural different cloud component networks 72, 74, 76, 78. "Cloud computing" is a model for enabling, on-demand network access to a shared pool of configurable computing resources (e.g., public and private networks, servers, storage, applications, and services) that are shared, rapidly provisioned and released with minimal management effort or service provider interaction.

This exemplary cloud computing model for electronic information retrieval promotes availability for shared resources and comprises: (1) cloud computing essential characteristics; (2) cloud computing service models; and (3) cloud computing deployment models. However, the present invention is not limited to this cloud computing model and other cloud computing models can also be used to practice the invention.

Exemplary cloud computing essential characteristics appear in Table 1. However, the present invention is not limited to these essential characteristics and more, fewer or other characteristics can also be used to practice the invention.

TABLE 1

On-demand electronic content storage and retrieval services. Electronic content storage and retrievers can unilaterally provision computing capabilities, such as server time and network storage, as needed automatically without requiring human interaction with each network server on the cloud communications network 18.
Broadband network access. Electronic content storage and retrieval capabilities are available over plural broadband communications networks and accessed through standard mechanisms that promote use by heterogeneous thin or thick client platforms (e.g., mobile phones, smart phones 14, tablet computers 12, laptops, PDAs, etc.). The broadband network access includes high speed network access such as 3G and/or 4G wireless and/or wired and broadband and/or ultra-broad band (e.g., WiMAX, etc.) network access.
Resource pooling. Electronic content storage retrieval computing resources are pooled to serve multiple requesters using a multi-tenant model, with different physical and virtual resources dynamically assigned and reassigned according to electronic content retrieval demand. There is location independence in that an requester of electronic content has no control and/or knowledge over the exact location of the provided by the electronic content storage and retrieval resources but may be able to specify location at a higher level of abstraction (e.g., country, state, or data center). Examples of pooled resources include storage, processing, memory, network bandwidth, virtual server network device and virtual target network devices.
Rapid elasticity. Capabilities can be rapidly and elastically provisioned, in some cases automatically, to quickly scale out and rapidly released to quickly scale for electronic content storage and retrieval. To the electronic content storage and retrievers, the electronic content storage and retrieval capabilities available for provisioning appear to be unlimited and can be used in any quantity at any time.
Measured Services. Cloud computing systems automatically control and optimize resource use by leveraging a metering capability at some level of abstraction appropriate to the type of electronic content retrieval service (e.g., storage, processing, bandwidth, custom electronic content retrieval applications, etc.). Electronic content retrieval usage is monitored, controlled, and reported providing transparency for both the electronic content provider and the electronic content requester of the utilized electronic content storage retrieval service.

Exemplary cloud computing service models illustrated in FIG. 4 appear in Table 2. However, the present invention is not limited to these service models and more, fewer or other service models can also be used to practice the invention.

TABLE 2

Cloud Computing Software Applications 62 for an Electronic Content Storage and Retrieval Service (CCSA 64). The capability to use the provider's applications 30, 30' running on a cloud infrastructure 66. The cloud computing applications 62, are accessible from the server network device 20 from various client devices 12, 14, 16 through a thin client interface such as a web browser, etc. The user does not manage or control the underlying cloud infrastructure 66 including network, servers, operating systems, storage, or even individual application 30, 30' capabilities, with the possible exception of limited user-specific application configuration settings.
Cloud Computing Infrastructure 66 for the an Electronic Content Storage and Retrieval Service (CCI 68). The capability provided to the user is to provision processing, storage and retrieval, networks 18, 72, 74, 76, 78 and other fundamental computing resources where the consumer is able to deploy and run arbitrary software, which can include operating systems and applications 30, 30'. The user does not manage or control the underlying cloud infrastructure 66 but has control over operating systems, storage, deployed applications, and possibly limited control of select networking components (e.g., host firewalls, etc.).
Cloud Computing Platform 70 for the an Electronic Content Storage and Retrieval Service (CCP 71). The capability provided to the user to deploy onto the cloud infrastructure 66 created or acquired applications created using programming languages and tools supported servers 20, 22, 24, 26, etc.. The user not manage or control the underlying cloud infrastructure 66 including network, servers, operating systems, or storage, but has control over the deployed applications 30, 30' and possibly application hosting environment configurations.

Exemplary cloud computing deployment models appear in Table 3. However, the present invention is not limited to these deployment models and more, fewer or other deployment models can also be used to practice the invention.

TABLE 3

Private cloud network 72. The cloud network infrastructure is operated solely for an electronic content storage and retrieval. It may be managed by the electronic content retrieval or a third party and may exist on premise or off premise.
Community cloud network 74. The cloud network infrastructure is shared by several different organizations and supports a specific electronic content storage and retrieval community that has shared concerns (e.g., mission, security requirements, policy, compliance considerations, etc.). It may be managed by the different organizations or a third party and may exist on premise or off premise.
Public cloud network 76. The cloud network infrastructure such as the Internet, PSTN, SATV, CATV, Internet TV, etc. is made available to the general public or a large industry group and is owned by one or more organizations selling cloud services.
Hybrid cloud network 78. The cloud network infrastructure 66 is a composition of two and/or more cloud networks 18 (e.g., private 72, community 74, and/or public 76, etc.) and/or other types of public and/or private networks (e.g., intranets, etc.) that remain unique entities but are bound together by standardized or proprietary technology that enables data and application portability (e.g., cloud bursting for load-balancing between clouds, etc.)

Cloud software 64 for electronic content retrieval takes full advantage of the cloud paradigm by being service oriented with a focus on statelessness, low coupling, modularity, and semantic interoperability for electronic content retrieval. However, cloud software services 64 can include various states.

Cloud storage of desired electronic content on a cloud computing network includes agility, scalability, elasticity and multi-tenancy. Although a storage foundation may be comprised of block storage or file storage such as that exists on conventional networks, cloud storage is typically exposed to requesters of desired electronic content as cloud objects.

In one exemplary embodiment, the cloud application 30', offers cloud services for electronic content storage and retrieval. The application 30, 30' offers the cloud computing Infrastructure 66, 68 as a Service 62 (IaaS), including a cloud software infrastructure service 62, the cloud Platform 70, 71 as a Service 62 (PaaS) including a cloud software platform service 62 and/or offers Specific cloud software services as a Service 62 (SaaS) including a specific cloud software service 62 for electronic content storage and retrieval. The IaaS, PaaS and SaaS include one or more of cloud services 62 comprising networking, storage, server network device, virtualization, operating system, middleware, run-time, data and/or application services, or plural combinations thereof, on the cloud communications network 18.

Figure 5:
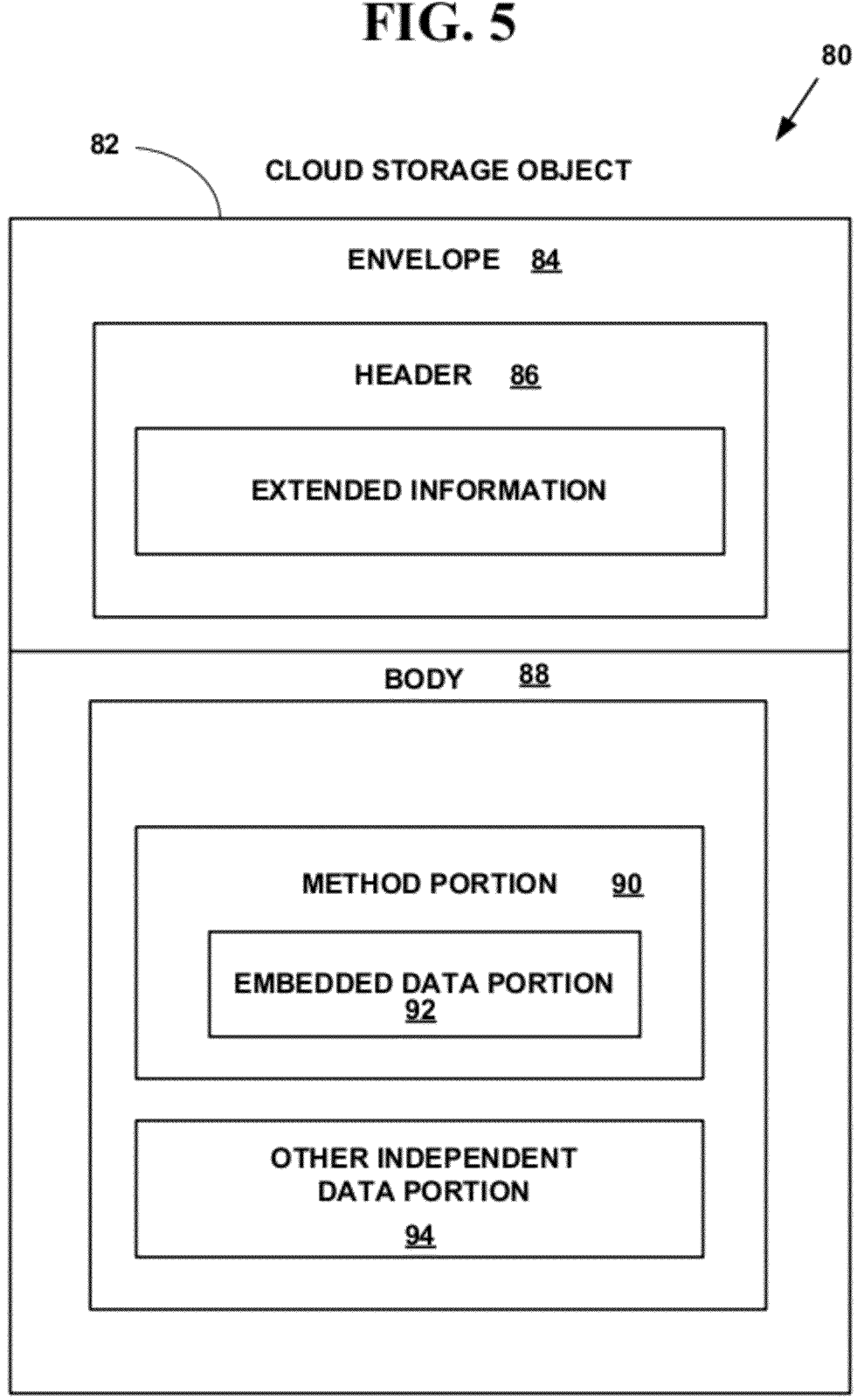
FIG. 5 is a block diagram illustrating an exemplary cloud storage object.

FIG. 5 is a block diagram 80 illustrating an exemplary cloud storage object 82.

The cloud storage object 82 includes an envelope portion 84, with a header portion 86, and a body portion 88. However, the present invention is not limited to such a cloud storage object 82 and other cloud storage objects and other cloud storage objects with more, fewer or other portions can also be used to practice the invention.

The envelope portion 84 uses unique namespace Uniform Resource Identifiers (URIs) and/or Uniform Resource Names (URNs), and/or Uniform Resource Locators (URLs) unique across the cloud communications network 18 to uniquely specify, location and version information and encoding rules used by the cloud storage object 82 across the whole cloud communications network 18. For more information, see IETF RFC-3305, Uniform Resource Identifiers (URIs), URLs, and Uniform Resource Names (URNs), the contents of which are incorporated by reference.

The envelope portion 84 of the cloud storage object 82 is followed by a header portion 86. The header portion 86 includes extended information about the cloud storage objects such as authorization and/or transaction information, etc.

The body portion 88 includes methods 90 (i.e., a sequence of instructions, etc.) for using embedded application-specific data in data elements 92. The body portion 88 typically includes only one portion of plural portions of application-specific data 92 and independent data 94 so the cloud storage object 82 can provide distributed, redundant fault tolerant, security and privacy features described herein.

Cloud storage objects 82 have proven experimentally to be a highly scalable, available and reliable layer of abstraction that also minimizes the limitations of common file systems. Cloud storage objects 82 also provide low latency and low storage and transmission costs.

Cloud storage objects 82 are comprised of many distributed resources, but function as a single storage object, are highly fault tolerant through redundancy and provide distribution of desired electronic content across public communication networks 76, and one or more private networks 72, community networks 74 and hybrid networks 78 of the cloud communications network 18. Cloud storage objects 82 are also highly durable because of creation of copies of portions of desired electronic content across such networks 72, 74, 76, 78 of the cloud communications network 18. Cloud storage objects 82 includes one or more portions of desired electronic content and can be stored on any of the 72, 74, 76, 78 networks of the cloud communications network 18. Cloud storage objects 82 are transparent to a requester of desired electronic content and are managed by cloud applications 30, 30'.

In one embodiment, cloud storage objects 82 are configurable arbitrary objects with a size up to hundreds of terabytes, each accompanied by with a few kilobytes of metadata. Cloud objects are organized into and identified by a unique identifier unique across the whole cloud communications network 18. However, the present invention is not limited to the cloud storage objects described, and more fewer and other types of cloud storage objects can be used to practice the invention.

Cloud storage objects 82 present a single unified namespace or object-space and manages desired electronic content by user or administrator-defined policies storage and retrieval policies. Cloud storage objects includes Representational state transfer (REST), Simple Object Access Protocol (SOAP), Lightweight Directory Access Protocol (LDAP) and/or Application Programming Interface (API) objects and/or other types of cloud storage objects. However, the present invention is not limited to the cloud storage objects described, and more fewer and other types of cloud storage objects can be used to practice the invention.

REST is a protocol specification that characterizes and constrains macro-interactions storage objects of the four components of a cloud communications network 18, namely origin servers, gateways, proxies and clients, without imposing limitations on the individual participants.

SOAP is a protocol specification for exchanging structured information in the implementation of cloud services with storage objects. SOAP has at least three major characteristics: (1) Extensibility (including security/encryption, routing, etc.); (2) Neutrality (SOAP can be used over any transport protocol such as HTTP, SMTP or even TCP, etc.), and (3) Independence (SOAP allows for almost any programming model to be used, etc.)

LDAP is a software protocol for enabling storage and retrieval of electronic content and other resources such as files and devices on the cloud communications network 18. LDAP is a "lightweight" version of Directory Access Protocol (DAP), which is part of X.500, a standard for directory services in a network. LDAP may be used with X.509 security and other security methods for secure storage and retrieval. X.509 is public key digital certificate standard developed as part of the X.500 directory specification. X.509 is used for secure management and distribution of digitally signed certificates across networks.

An API is a particular set of rules and specifications that software programs can follow to communicate with each other. It serves as an interface between different software programs and facilitates their interaction.

Bar Codes

A "barcode" is an optical machine-readable representation of data, which shows data about the object to which it attaches. Originally, barcodes represented data by varying the widths and spacings of parallel lines, and may be referred to as linear or 1 dimensional (1D). Later they evolved into rectangles, dots, hexagons and other geometric patterns in 2 dimensions (2D). Although 2D systems use a variety of symbols, they are generally referred to as barcodes as well. Barcodes originally were scanned by special-optical scanners called barcode readers, scanners and interpretive software are available on devices including desktop printers (not illustrated) and smart phones 14 and tablet computers 12.

Table 4 illustrates exemplary linear barcodes, the standards of all of which are incorporated by reference. However, the present invention is not limited to the exemplary linear barcodes listed in Table 4, and more fewer and other linear barcodes can also be used to practice the invention.

TABLE 4

| Linear Bar Codes |
|---|
| U.P.C. |
| Codabar |
| Code 25 - Non-interleaved 2 of 5 |
| Code 25 - Interleaved 2 of 5 |
| Code 39 |
| Code 93 |
| Code 128 |
| Code 128A |
| Code 128B |
| Code 128C |
| Code 11 |
| CPC Binary |
| DUN 14 |
| EAN 2 |
| EAN 5 |
| EAN 8, EAN 13 |
| Facing Identification Mark |
| GS1-128 (formerly known as UCC/EAN-128), incorrectly referenced as EAN 128 and UCC 128 |
| GS1 DataBar, formerly Reduced Space Symbology (RSS) |
| HIBC (HIBCC Health Industry Bar Code) |
| ITF-14 |
| Latent image barcode |
| Pharmacode |
| Plessey |
| PLANET |
| POSTNET |
| Intelligent Mail barcode |
| MSI |
| PostBar |
| RM4SCC/KIX |
| JAN |
| Telepen |

Table 5 illustrates exemplary matrix (2D) barcodes, the standards of all of which are incorporated by reference. However, the present invention is not limited to the exemplary matrix barcodes listed in Table 5, and more fewer and other matrix barcodes can also be used to practice the invention.

TABLE 5

Matrix Bar Codes

3-DI
ArrayTag
Aztec Code
Small Aztec Code
Chromatic Alphabet
Codablock
Code 1
Code 16K
Code 49
ColorCode
Compact Matrix Code
CP Code
CyberCode
d-touch
DataGlyphs
Datamatrix
Datastrip Code
Dot Code A
EZcode
Grid Matrix Code
High Capacity Color Barcode
HueCode
INTACTA.CODE
InterCode
JAGTAG
Lorem ipsum
MaxiCode
mCode
MiniCode
MicroPDF417
MMCC
Nintendo e-Reader#Dot code
Optar
PaperDisk
PDF417
PDMark
QR Code
QuickMark Code
SmartCode
Snowflake Code
ShotCode
SPARQCode
SuperCod
Trillcode
UltraCode
UnisCode
VeriCode, VSCode
WaterCode In one specific embodiment, the cloud application 30, 30' interacts with a bar code reader application. However, the present invention is not limited to a bar code reader application and other applications can also be used to practice the invention.

Figure 6:
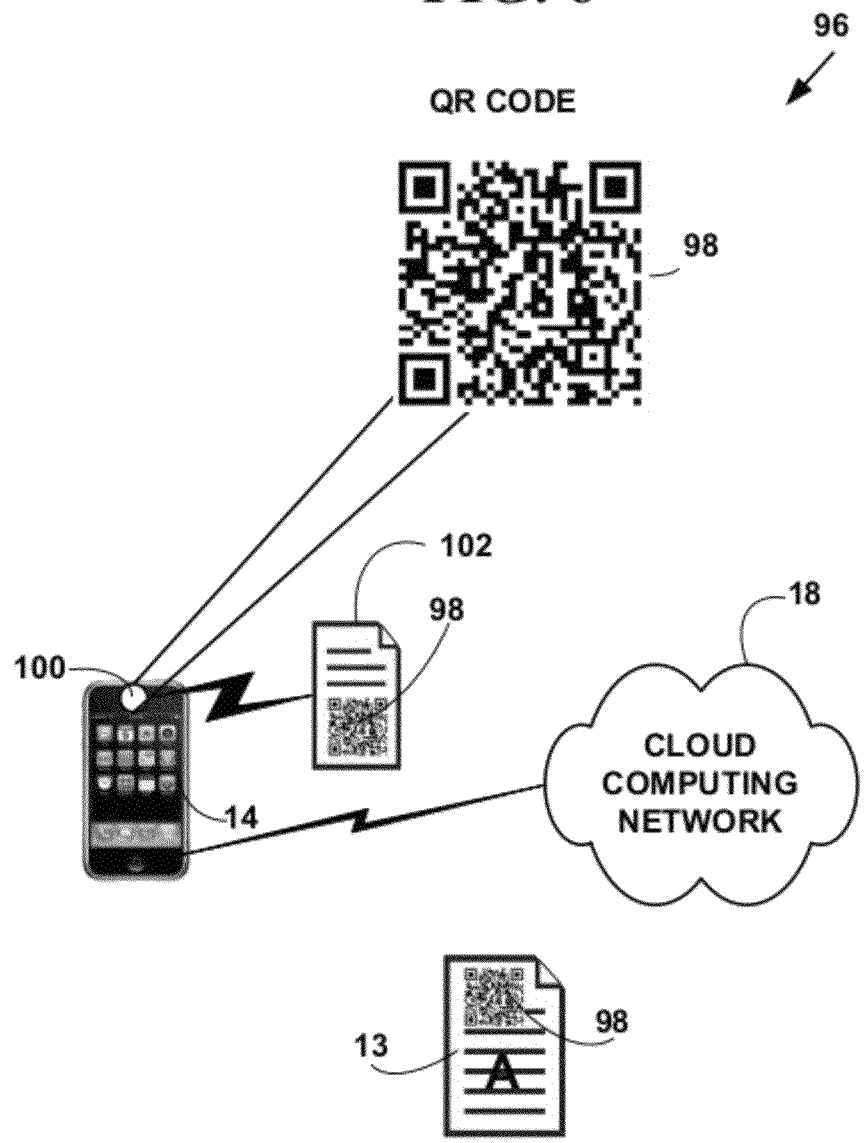
FIG. 6 is a block diagram illustrating an exemplary QR bar code.

In one specific exemplary embodiment, a QR bar code is used. However, the present invention is not limited to QR codes and other types of bar codes can also be used to practice the invention FIG. 6 is a block diagram 96 illustrating display of an exemplary QR bar code 98. The QR bar code 98 in FIG. 6 is a valid QR bar code generated and including the text "This is a QR generated by Zachary C. Lesavich."

A "QR Code" is a specific matrix barcode (or two-dimensional code), readable by dedicated QR barcode readers and camera phones. The code consists of black modules arranged in a square pattern on a white background. The information encoded can be text, URL or other data. QR codes are defined in *ISO/IEC* 18004:2006 *Information technology—Automatic identification and data capture techniques—QR Code* 2005 *bar code symbology specification,* 1 Sep. 2006, the contents of which are incorporated by reference.

Users with a camera equipped smart phone 14 (or tablet computer 12, etc.) with a the camera component 100, a bar code reader application appropriate for the bar code processes the digital image of the QR Code can include the QR Code 98. The camera component 100 is used to capture existing QR codes from print and electronic documents 102 and other sources (e.g., from other network devices, etc.)

QR codes 98 are also used to display text, contact information, connect to a wireless network, open a web page in the phone's browser, download music, communicate a social event or coupon, or initiate a communications event over the cloud communications network 18 (e.g., voice call, data call, etc.) This act of linking from physical world objects is known as a "hardlink" or "physical world hyperlinks."

For example, Google's smart phone Android operating system supports the use of QR codes by natively including the barcode scanner (e.g., Zxing, etc.) on some models, and the browser supports Uniform Resource Identifier (URI) redirection, which allows QR Codes to send metadata to existing applications on the device. Nokia's Symbian operating system is also provided with a barcode scanner, which is able to read QR codes, while mbarcode is a QR code reader for the Maemo operating system. In the Apple iOS, a QR code reader is not natively included, but hundreds of free applications available with reader and metadata browser URI redirection capability. However, the present invention is not limited to these network device operating systems and other bar code readers and device operating systems can also be used to practice the invention.

In one embodiment, a user may scan a number of QR bar codes 98 from non-electronic information such as magazines, business cards, billboards, other non-electronic advertising, etc. A user may also scan a number of QR bar codes 98 from electronic advertising such from web-sites, other target network devices 12, 14, 16, from e-mails, text messages, instant messages, etc.

Storing Cloud Objects on Cloud Computing Networks using Galois Fields

A "field" is an algebraic object with at least two operations: addition and multiplication. However, fields do not use ordinary math addition and multiplication. With field addition all the elements of the field must form a commutative group, with identity denoted by zero and the inverse of a field element f denoted by −f. For field multiplication all the elements of the field except zero must form another commutative group with identity denoted buy one and inverse off denoted by $f^{-1}$. The element zero has no inverse under field multiplication. The distributive identity must also satisfy: $a*(b+c)=(a*b)+(a*c)$, for all field elements a, b, and c.

In one embodiment, finite Galois fields are used. For any prime integer p and any integer n greater than or equal to one, there is at one unique field with $p^n$ elements in it, denoted $GF(p^n)$. In the case n is equal to one, the Galois field is just the integers mod p, in which field addition and field multiplication are just the ordinary math versions followed by taking the remainder on division by p.

The "modulo" operation determines a remainder of a division of one number by another. Given two positive numbers, a (i.e., the dividend) and n (i.e., the divisor, a modulo n (i.e., a mod n) is a remainder of a division of a by n.

In one embodiment, p=2 and n=8, so $GF(2^8)$, an 8-bit representation of numbers is used. This field allows decimal numbers in the range from zero to 255 since $2^8=256$. Elements of $GF(p^n)$ are represented as polynomials of degree strictly less than n over $GF(p)$. A polynomial is an expression of finite length constructed from variables and constants and non-negative integer exponents (e.g., $x^6+x^4+x+1$, etc.). $GF(2^8)$ is used because $2^8$ is an even power of 2 and 8 is the number of bits in a "byte" a term used a common unit of storage in a computer readable medium. However, the present invention is not limited to this embodiment and other values of p and n can be used to create Galois fields and to practice the invention (e.g., $GF(3^7)$, etc.)

When the p is the prime integer 2, elements of $GF(p^n)$ are expressed as binary numbers, with each term in a polynomial represented by one bit in the corresponding element's binary expression. This can be represented as a polynomial b(x) with binary coefficients b {0,1} as $b^7x^7+b^6 x^6+b^5 x^5+b^4 x^4+b^3 x^3+b^2 x^2+b^1 x+b0$. For example, the following are equivalent representations of the same value in a characteristic 2 finite Galois field: (Polynomial: $x^6+x^4+x+1$) is equal to Binary: {01010011}. Since $GF(2^8)$, there is no $x^7$, so a zero is placed in the binary, there is an $x^6$, so a one is placed in the binary, there is no $x^5$, so a zero is placed in the binary, etc.

The difficult part of a Galois field is finding the multiplicative inverse of an element, that is, given a non-zero element a in $Z_p$, finding $a^{-1}$. This is the same as finding b such that a*b % p=1, wherein "%" is the modulus operator.

Since multiplicative inverses of Galois fields are hard to find, they are often are used in encryption methods (e.g., versions of AES, etc.). Galois fields are used in the present invention in part to make it difficult to determine locations of portions of electronic content 13', 15' or a whole portion 13, 15 is distributed to server network device 22, 24, 26 address locations determined using Galois fields.

Electronic Content Storage with Cloud Computing Networks

Figure 7A:
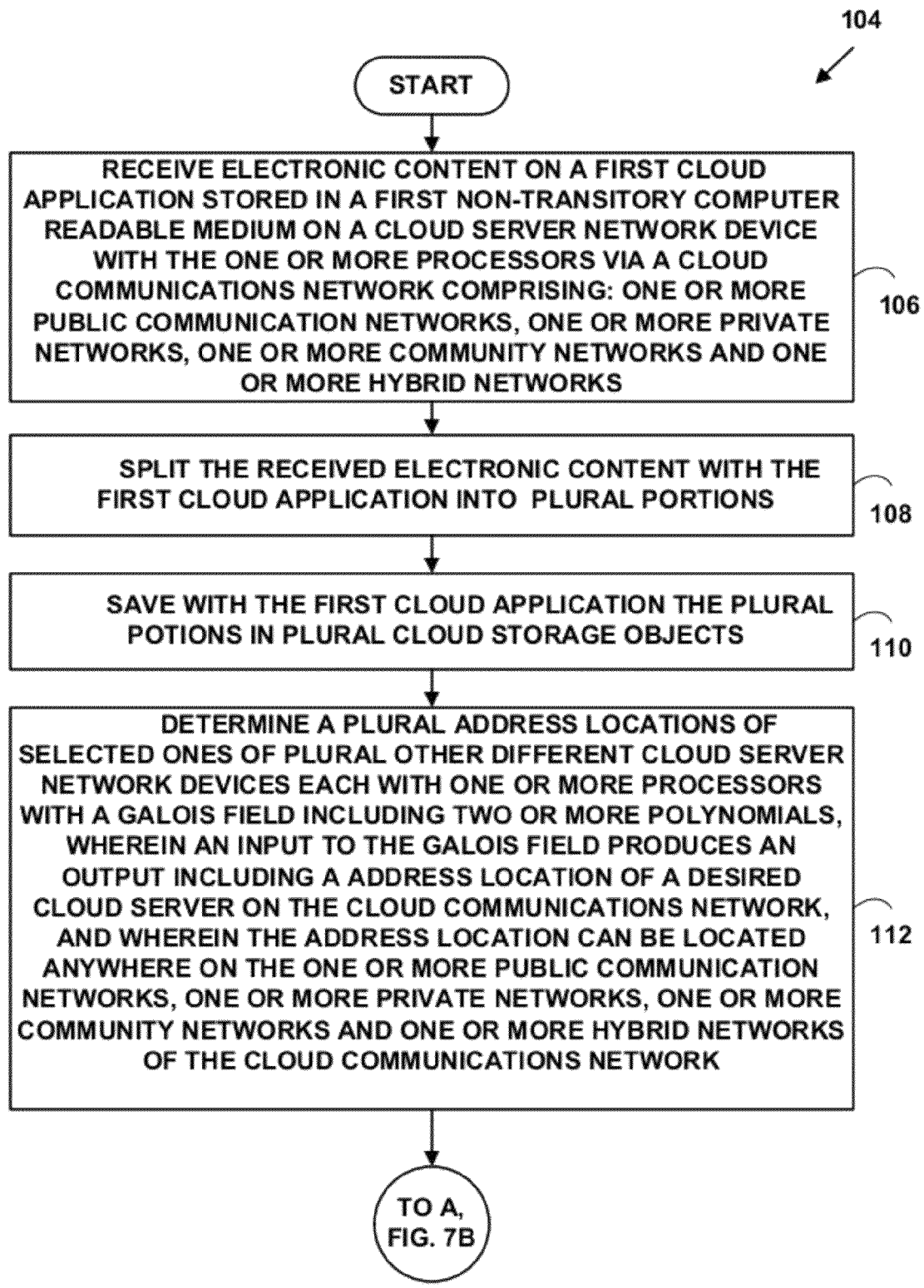
FIGS. 7A and 7B are a flow diagram illustrating a method for storing electronic content with cloud computing.

FIG. 7 is a flow diagram illustrating a Method 104 for storing electronic content with cloud computing. In FIG. 7A at Step 106, electronic content is received on a first cloud application stored in a first non-transitory computer readable medium on a cloud server network device with the one or more processors via a cloud communications network comprising: one or more public communication networks, one or more private networks, one or more community networks and one or more hybrid networks. At Step 108, the received electronic content is split with the first cloud application into plural portions. At Step 110, the first cloud application saves the plural potions in plural cloud storage objects. At Step 112, plural address locations of selected ones of plural of other different cloud server network devices each with one or more processors are determined with a Galois field. An input to the Galois field produces an output including an address location of a desired cloud server on the cloud communications network. The address location can be located anywhere on the one or more public communication networks, one or more private networks, one or more community networks and one or more hybrid networks of the cloud communications network.

Figure 7B:
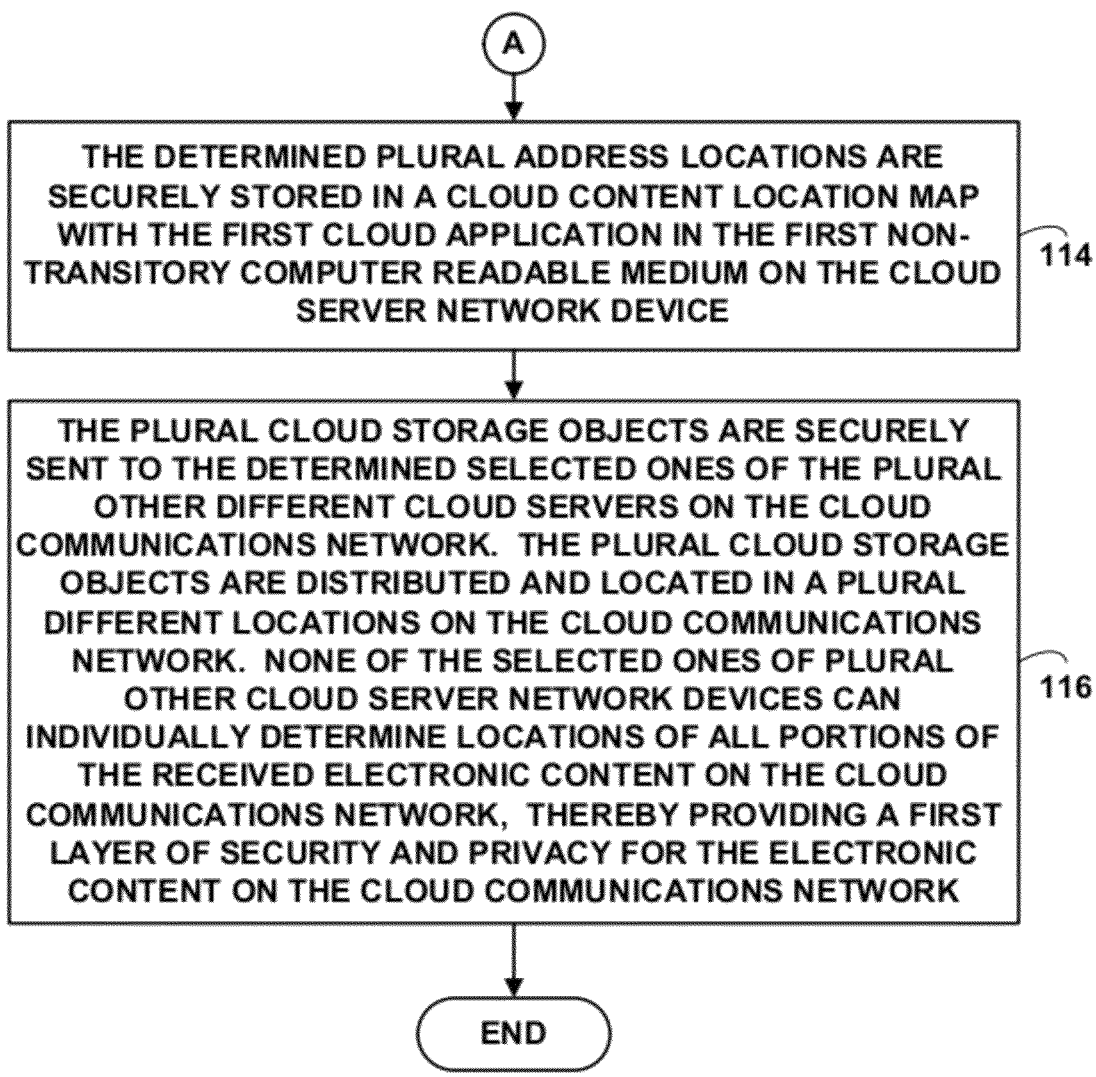

In FIG. 7B at Step 114, the determined plural address locations are securely stored in a cloud content location map with the first cloud application in the first non-transitory computer readable medium on the cloud server network device. At Step 116, the plural cloud storage objects are securely sent to the determined selected ones of the plural other different cloud servers on the cloud communications network. The plural cloud storage objects are distributed and located in plural different locations on the cloud communications network. None of the selected ones of plural other cloud server network devices can individually determine locations of all portions of the received electronic content on the cloud communications network, thereby providing a first layer of security and privacy for the electronic content on the cloud communications network.

Method 104 is illustrated with an exemplary embodiment. However, the present invention is not limited to this embodiment and other embodiments can be used to practice the invention.

In such an exemplary embodiment, in FIG. 7A at Step 106, electronic content 13 is received on a first cloud application 30' and stored in a first non-transitory computer readable medium on a cloud server network device (e.g., 20, etc.) with the one or more processors via a cloud communications network 18 comprising: one or more public communication networks 76, one or more private networks 72, one or more community networks 74 and one or more hybrid networks 78.

At Step 108, the received electronic content (e.g., 13, etc.) is split with the first cloud application 30' into plural portions (e.g., 13', etc.).

At Step 110, the first cloud application 30' saves the plural potions 13' in plural cloud storage objects 82. In one embodiment, one or more QR codes 98 are added to the plural cloud storage objects 82 to uniquely identify a whole portion 13 or uniquely identify the plural portions 13' of the desired electronic content. However, the present invention is not limited to such an embodiment and other identifiers can be used to uniquely identify electronic content 13, 15.

At Step 112, plural address locations of selected ones of plural of other different cloud server network devices 22, 24, 26 each with one or more processors are determined with a Galois field. An input to the Galois field produces an output including a address location of a desired cloud server 22, 24 on the cloud communications network. The address location can be located anywhere on the one or more public communication networks 76, one or more private networks 72, one or more community networks 74 and one or more hybrid networks 78 of the cloud communications network 18.

For example, the Galois field produces the output by completing one or more field operations including field addition, field multiplication and field modulus operations on the input to the Galois field as was described above. However, the present invention is not limited to such an embodiment, and other field operations can be used on the Galois field to practice the invention.

In one embodiment, the Galois field is represented as a set of plural software instructions in the non-transitory computer readable medium on the cloud server network device 20 and is assessable via and used by the first cloud application 30'.

In another embodiment, the Galois field is implemented in hardware or firmware on the cloud server network device 30, or a combination of software, hardware and/or firmware.

In one embodiment, p=2 and n=8, so $GF(2^8)$. However, the present invention is not limited to such an embodiment, and other values can be used for p and n in $GF(p^n)$.

In one embodiment, two exemplary polynomials are included in the Galois field $GF(2^8)$. The choice of polynomials have no effect on field addition operations on the Galois field. However, the choice of polynomials is relevant for the field operation of multiplication and provides a modulus for field multiplication operations.

In one embodiment, two exemplary polynomials include, but are not limited to, $p_1(x)=x^4+x^3+x+1$ and $p_2(x)=x^4+1$. The two polynomials are field multiplied together using input data for x. However, the present invention is not limited to such an embodiment. more, fewer and other polynomials can be used to practice the invention.

Since Galois fields are very complicated, a simple example, using the Galois Field $GF(2^3)$ and the polynomial $P(x)=x^3+x+1$ is provided to illustrate the invention. (The $GF(2^8)$ and $p_1(x)=x^4+x^3+x+1$ and $p_2(x)=x^4+1$ are very complicated and include several hundred entries but are determined in a similar manner to the simple example illustrated in Table 6.).

The simple exemplary $GF(2^3)=GF(8)$ since two raised to the third power is eight. A result from the Galois field $GF(2^3)$ is (1011) (binary) is equal to the number (11) (decimal). Values in $GF(2^3)$ are 3-bits each, spanning the decimal number range zero through seven. Galois field multiplication takes place on 3-bit binary values (with modulo two addition, where the two and three are from $2^3$) and the result is computed modulo P(x), so the result is (1011) binary which is equal to the number 11 (decimal).

Table 6 illustrates exemplary Galois field multiplication and Galois field addition tables used for a very simple Galois Field $GF(2^3)$ with the polynomial $P(x)=x^3+x+1$. The results are listed in decimal number format. (Similar tables are used to Galois field multiply input values $GF(2^8)$ for $p_1(x)=x^4+x^3+x+1$ and $p_2(x)=x^4+1$ to increase output speed for the Galois field operations.)

For example, Table 6 with Galois Field $GF(2^3)$ and $P(x)=x^3+x+1$, and be used to verify the Galois field multiplication of 5×4, wherein 5(decimal)x4(decimal)=(101)binary x(100)binary=(10100)=(101)binary mod(1011)binary=5(decimal) mod 11(decimal)=2(decimal). As Table 6, illustrates, the element zero has no inverse and is not used under Galois field multiplication.

In this simple example, Galois field addition takes places on 3-bit binary values using bitwise exclusive OR (XOR), operations. A "bitwise XOR" operation takes two bit patterns of equal length and performs a logical exclusive OR operation on each pair of corresponding bits. The result in each position is one if only the first bit is one or only the second bit is one, but will be zero if both bits are zero or both bits are one. In the comparison of two bits, if the two bits are different the XOR result is a one, and the XOR result is a zero if they are the same.

Table 6 can be also used to verify the Galois field $GF(2^3)$ addition of 5+4=(101)XOR(100)=(001)=1(decimal). Note, however, as was discussed above, the choice of the polynomial P(x) plays no role in the Galois Field addition operation.

TABLE 6

| GF × | 1 | 2 | 3 | 4 | 5 | 6 | 7 | GF + | 0 | 1 | 2 | 3 | 4 | 5 | 6 | 7 |
|---|---|---|---|---|---|---|---|---|---|---|---|---|---|---|---|---|
| 1 | 1 | 2 | 3 | 4 | 5 | 6 | 7 | 0 | 0 | 1 | 2 | 3 | 4 | 5 | 6 | 7 |
| 2 | 2 | 4 | 6 | 3 | 1 | 7 | 5 | 1 | 1 | 0 | 3 | 2 | 5 | 4 | 7 | 6 |
| 3 | 3 | 6 | 5 | 7 | 4 | 1 | 2 | 2 | 2 | 3 | 0 | 1 | 6 | 7 | 4 | 5 |
| 4 | 4 | 3 | 7 | 6 | 2 | 5 | 1 | 3 | 3 | 2 | 1 | 0 | 7 | 6 | 5 | 4 |
| 5 | 5 | 1 | 4 | 2 | 7 | 3 | 6 | 4 | 4 | 5 | 6 | 7 | 0 | 1 | 2 | 3 |
| 6 | 6 | 7 | 1 | 5 | 3 | 2 | 4 | 5 | 5 | 4 | 7 | 6 | 1 | 0 | 3 | 2 |
| 7 | 7 | 5 | 2 | 1 | 6 | 4 | 3 | 6 | 6 | 7 | 4 | 5 | 2 | 3 | 0 | 1 |
| | | | | | | | | 7 | 7 | 6 | 5 | 4 | 3 | 2 | 1 | 0 |

For additional security and privacy, the values for p and n and the two (or more) polynomials are periodically changed in the Galois field. The corresponding instructions and tables, etc. are replaced in the non-transitory computer readable medium on the cloud server network device 20. In such an embodiment, new tables of Galois Field output numbers are calculated and stored in the computer readable medium on the cloud server network device 20.

In one embodiment, field multiplication in $GF(2^8)$ includes multiplying data for the two polynomials modulo using an irreducible polynomial of degree eight (e.g., $p(x)=x^8+x^4+x^3+x+1$, etc.). Such an irreducible polynomial provides an additional level of security for use of the Galois field. However, the present invention is not limited to such an embodiment and other polynomials can be used to practice the invention.

In one embodiment, the input is to the Galois field is a sequence of binary digits (i.e., ones and zeros) obtained from two or more random numbers from a random number generator accessible by the first cloud application 30' (e.g., if the decimal number 176 is obtained from the random number generator, then binary number 10110000 (since 176 (decimal) is equal to 10110000 (binary)) is input to the Galois field, etc.). However, the present invention is not limited to this embodiment and other types of inputs can be used as inputs to the Galois field including pre-determined sequences of numbers, prime numbers, digitized user encoded biometrics, tables of selected numbers, etc.

"Biometrics" are patterns derived from physical features (e.g., fingerprints, iris patterns scanned from an eye, facial scan patterns, etc.) or emissions (e.g., voice patterns, DNA samples, hair samples blood samples, etc.) of a human body.

In one embodiment, the biometric information is included in binary bit patterns and run through a encryption method (e.g., AES, DES, MD5, etc.). Biometric encryption methods securely bind a digital key to a biometric, or extract a key from the biometric. Neither the key nor the biometric can be retrieved from a stored biometric template. The key is re-created only if a correct biometric sample is presented on verification. An output of biometric encryption is verification that either a key is correct or incorrect.

In one embodiment, the input to the Galois field produces an output including a virtual cloud communication network addresses, an Internet Protocol (IP) address and/or a Medium Access Control (MAC) address and/or a TCP and/or a UDP and/or other protocol port designation and/or combinations thereof. However, the present invention is not limited to such address location and other address locations can be used to practice the invention.

In one embodiment, the virtual cloud communication network addresses include virtual addresses of cloud server network devices 22, 24, 26 located anywhere on the cloud communications network 18. However, the present invention is not limited to such an embodiment and other embodiments can be used to practice the invention. In such an embodiment, the virtual cloud communication network addresses include, for example, virtual designations, for example, as cloud_server_1_private_network_1, cloud server_2_public_network_3, etc. (e.g., Table 7, etc.) However, the present invention is not limited to such notation and other notation can be used to practice the invention.

Table 7 illustrates exemplary address locations for plural cloud server network devices 22, 24, 26 on the plural networks 72, 74, 76, 78 on the cloud network 18 based on the field multiplication values from the Galois Filed outputs of Table 6. Address locations are illustrated with exemplary virtual addresses, IP addresses, MAC (data link) addresses and UDP port addresses and combinations therefore for cloud server network devices 22, 24, 26 for simplicity. However, the present invention is not limited to such an embodiment and other embodiments can be used to practice the invention.

TABLE 7

| GF($2^3$) with polynomial P(x) = $x^3$ + x + 1 Field multiplication and addition output values | Cloud Network Server Address Location |
|---|---|
| 1 | cloud_server_1_private_network_1 |
| 2 | cloud_server_2_public_network_3 |
| 3 | cloud_server_3_hybrid_network_1 |
| 4 | cloud_server_4_community_network_2 |
| 5 | 120.101.32.16 (IP address) |
| 6 | cloud_server_6_hybrid_network_3:UDP_port_53 (virtual server address:UDP_port) |
| 7 | 00-B0-D0-86-BB-F7 (MAC address) |

The address location column of Table 7 is periodically changed to provide additional security and privacy. Individual address locations from a list of address locations of cloud server network devices 22, 24, 26 are selected using a random number generator. The output from the random number generator is used to add the individual address locations into a row and column in Table 7. However, the present invention is not limited to such an embodiment and other embodiments can be used to practice the invention.

In one embodiment, the output from the Galois field includes a number which is used to reference a location in an address location table (e.g., Table 7, etc.). However, the present invention is not limited to such an embodiment and other embodiments, including or not including tables can be used to practice the invention.

In another embodiment, another input used for the Galois field is physical location information of the target network device 12, 14, 16.

In one embodiment, the physical location information includes Global Positioning System (GPS) information, street address information, two-dimensional (2D) geo-space (e.g., X, Y) (e.g., building, floor), three-dimensional (3D) (X, Y, Z) (e.g., building, floor, floor location (e.g., room, office, desk, etc.)) or other physical location information (e.g., longitude, latitude, street address, etc.). However, the present invention is not limited to such physical location information and other physical location information can be used to practice the invention.

The Global Positioning System (GPS) is a space-based global navigation satellite system (GNSS) that provides reliable location and time information in all weather and at all times and anywhere on or near the Earth. A GPS receiver calculates its position by precisely timing signals sent by GPS satellites. A GPS receiver uses the messages it receives to determine a transit time of each message and computes a distance to each GPS satellite. These distances along with the satellites' locations are used with the possible aid of triangulation, depending on which algorithm is used, to compute a current physical position of the GPS receiver. This position is then displayed, perhaps with a moving map display (e.g., at a street level, etc.) and/or latitude and longitude and/or elevation and/or speed and/or acceleration information may also be included. Many GPS units also show derived information such as travel direction and speed, calculated from position changes. The GPS coordinates include standard GPS, GPS map, Digital GPS (DGPS) and/or other types of GPS information.

In such embodiments, the output from the Galois field includes address locations of selected ones of the plural of other cloud server network devices 22, 24, 26 that are physically closest to the target network device 12, 14, 16 requesting the desired electronic content. In such an embodiment, the desired electronic content is delivered faster to the target network device 12, 14, 16, the servers 22, 24, 26 used to store portions of the desired electronic content are physically close to the target network device 12, 14, 16. One reason faster delivery can occur is that a wireless and/or wired communication is faster when a communications is stronger. Stronger signals occur when a network device is closer to a signal source. However, the present invention is not limited to such an embodiment and other embodiments can be used to practice the invention.

The various embodiments have been described with Galois fields using decimal numbers. However, decimal number were only used to make it easier for person skilled in the art to understand the invention. In an actual implementation of the invention on a cloud computing network 18, one or more processors on the cloud target network device 20 executes the cloud application 30' and the methods described herein as a series of instructions in a non-transitory computer readable medium. Therefore the Galois filed would directly use binary representations for all inputs and outputs of the Galois field and conversions to and from decimal numbers would not be necessary as the inputs and outputs need not be in human readable form for the one or more processors.

Galois fields are also used because operations used on the Galois fields are native to network device processors and internal hardware, such as shift left for multiplication, shift right for division, logical AND, OR, XOR, etc. Galois fields can be implemented in hardware as a series of Returning to FIG. 7B at Step 114, the determined plural address locations are securely stored in a cloud content location map 17 with the first cloud application 30' in the first non-transitory computer readable medium on the cloud server network device 20. In another embodiment, the cloud content location map 17 is stored in a secure database 20' associated with the cloud server network device 20. However, the present invention is not limited to this embodiment and types of storage can be used to store the cloud content location map.

In one embodiment, the cloud content location map 17 is encrypted using a Discrete Logarithm Integrated Encryption Scheme (DLIES), a Elliptic Curve Integrated Encryption Scheme (ECIES), a user generated biometric or a Homomorphic encryption method. These encryption methods are used because they can be used efficiently and quickly with Galois fields. However, the present invention is not limited to this embodiment and other encryption methods described herein can be used to encrypt the cloud content location map.

At Step 116, the plural cloud storage objects 82 are securely sent to the determined selected ones of the plural other different cloud servers 22, 24, 26 on the cloud communications network 18. The plural cloud storage objects 82 are distributed and located in a plural different locations on the cloud communications network 18. None of the selected ones of plural other cloud server network devices 22, 24, 26 can individually determine locations of all portions of the received electronic content on the cloud communications network 18, thereby providing a first layer of security and privacy for the electronic content on the cloud communications network 18.

In one embodiment, the plural cloud storage objects are securely sent using a Wireless Encryption Protocol (WEP), Wireless-Wi-Fi Protected Access (WPA), Robust Security Network (RSN), Advanced Encryption Standard (AES), Data Encryption Standard (DES), Triple Data Encryption Standard (3DES), Secure Hash Algorithm (SHA), Message Digest-5 (MD-5), Electronic Code Book (ECB), Diffie and Hellman (DH), HyperText Transport Protocol Secure, (HTTPs), Secure Sockets Layer (SSL), Transport Layer Security (TLS) security method, Discrete Logarithm Integrated Encryption Scheme (DLIES), a Elliptic Curve Integrated Encryption Scheme (ECIES), biometric or a Homomorphic encryption method. However, the present invention is not limited to this embodiment and other encryption methods described herein can be used to practice the invention.

In another embodiment, Method 104 is used without splitting the received electronic content into plural portions. In such an embodiment, a whole portion of the received electronic content 13 is copied by the first cloud application 30' into a single cloud storage object 82. The Galois filed is used to determine an address location of a single cloud server network device 22, 24, 26 on the networks 72, 74, 76, 78 that comprise the cloud network 18. The single cloud storage object 82 is sent to the address location of that cloud network server device. When the desired electronic content is requested, the whole portion of the electronic content 13 is returned and removed from the cloud storage object 82 and sent to the target network device 12.

Electronic Content Retrieval with Cloud Computing Networks with Galois Fields

Figure 8A:
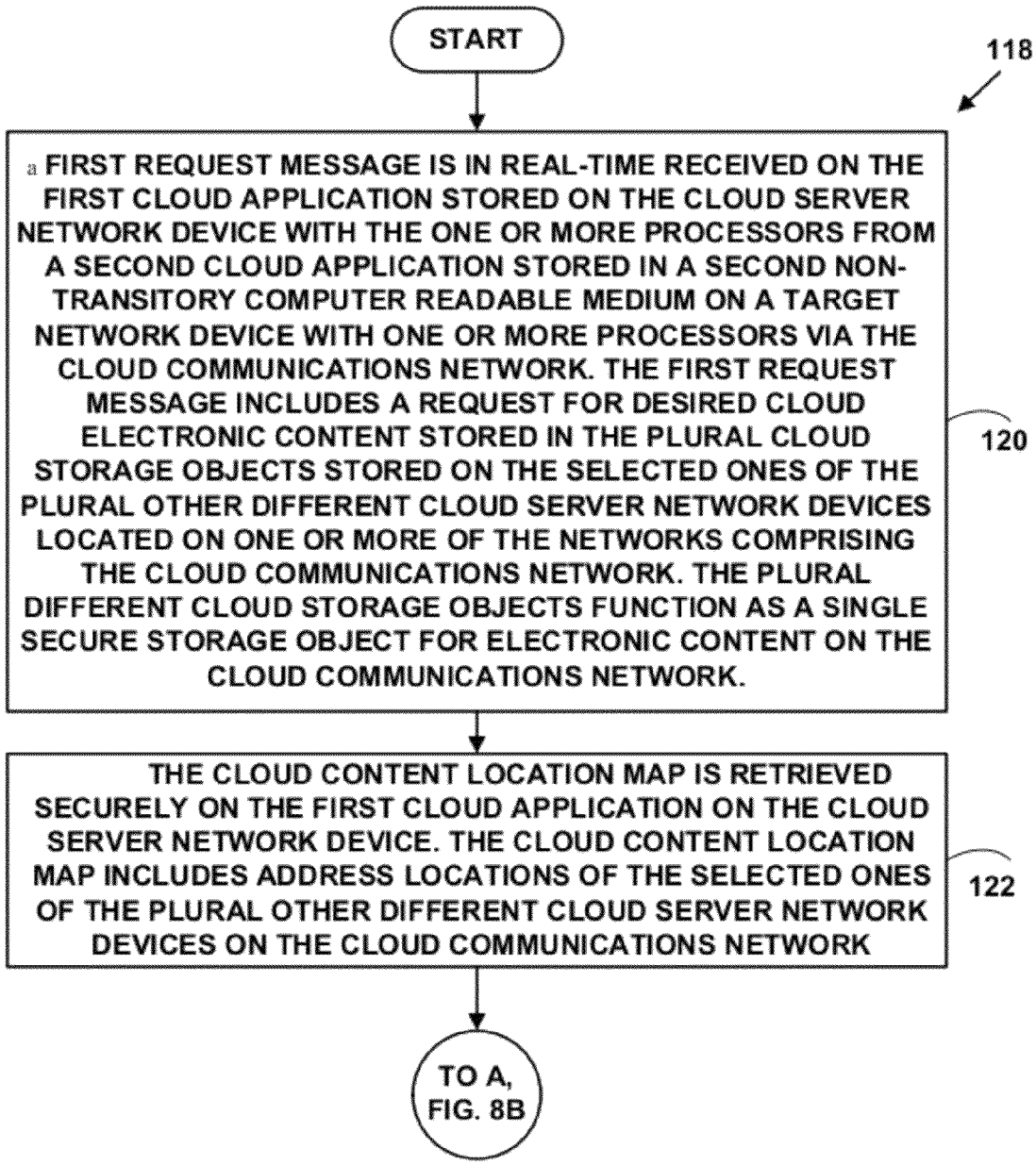
Figure 8B:
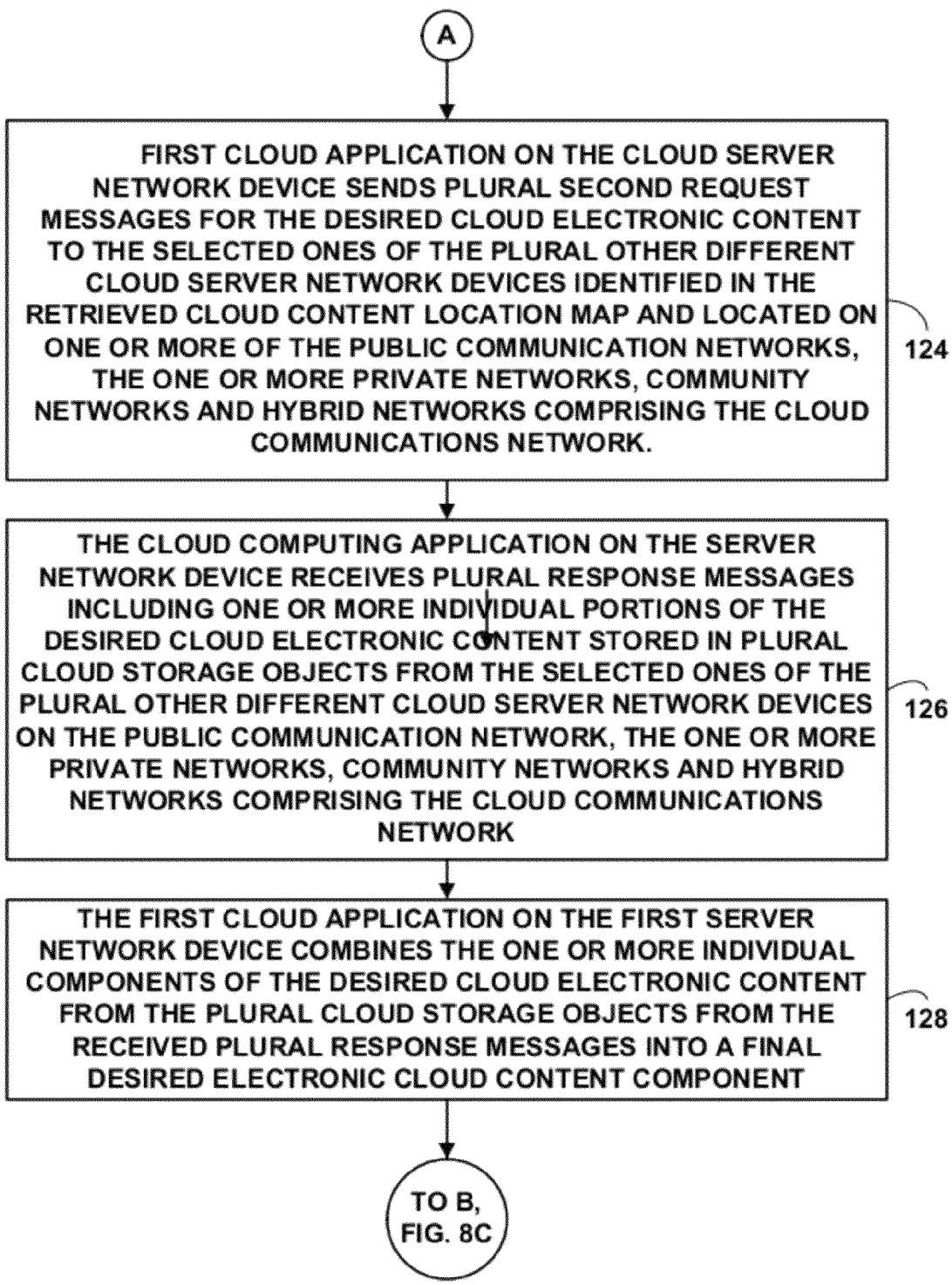

FIGS. 8A, 8B and 8C are a flow diagram illustrating a Method 118 for providing electronic content retrieval with cloud computing. At Step 120, a first request message is received in real-time on the first cloud application stored on the cloud server network device with the one or more processors from a second cloud application stored in a second non-transitory computer readable medium on a target network device with one or more processors via the cloud communications network. The first request message includes a request for desired cloud electronic content stored in the plural cloud storage objects stored on the selected ones of the plural other different cloud server network devices located on one or more of the networks comprising the cloud communications network. The plural different cloud storage objects function as a single secure storage object for electronic content on the cloud communications network. At Step 122, the cloud content location map is retrieved securely on the first cloud application on the cloud server network device. The cloud content location map includes address locations of the selected ones of the plural other different cloud server network devices on the cloud communications network. In FIG. 8B at Step 124, the first cloud application on the cloud server network device sends plural second request messages for the desired cloud electronic content to the selected ones of the plural other different cloud server network devices identified in the retrieved cloud content location map and located on one or more of the public communication networks, the one or more private networks, community networks and hybrid networks comprising the cloud communications network. At Step 126, the cloud computing application on the server network device receives plural response messages including one or more individual portions of the desired cloud electronic content stored in plural cloud storage objects from the selected ones of the plural other different cloud server network devices on the public communication network, the one or more private networks, community networks and hybrid networks comprising the cloud communications network. At Step 128, the first cloud application on the first server network device combines the one or more individual components of the desired cloud electronic content from the plural cloud storage objects from the received plural response messages into a final desired electronic cloud content component. In FIG. 8C at Step 130, the first cloud application on the cloud server network device securely sends in real-time the final desired cloud electronic content component as the request desired cloud electronic content to the target network device via the cloud communications network. The second cloud application on the target network device cannot determine the desired cloud electronic content was split and was stored in plural cloud storage objects and cannot determine which of plural selected ones of the other different cloud server network devices on which ones of the public, private, community or hybrid networks on the cloud communications network may have stored portions of the final desired cloud electronic content, thereby providing a second layer of security and privacy for the desired cloud electronic content on the cloud communications network.

Method 118 is illustrated with an exemplary embodiment. However, the present invention is not limited to this embodiment and other embodiments can be used to practice the invention.

In such an exemplary embodiment, in FIG. 8A at Step 120, a first request message is received in real-time on the first cloud application 30' stored in the first non-transitory computer readable medium on the cloud server network device 20 with the one or more processors from a second cloud application 30 stored in a second non-transitory computer readable medium on a target network device (e.g. 12, etc.) with one or more processors via the cloud communications network 18.

The first request message includes a request for desired cloud electronic content 13 stored in the plural cloud storage objects 82 stored on the selected ones of the plural other different cloud server network devices 22, 24, 26 located on one or more of the networks 72, 74, 76, 78, comprising the cloud communications network 18. The plural different cloud storage objects 82' function as a single, transparent secure storage object 82 for electronic content on the cloud communications network 18.

In this embodiment, "real-time" includes a time period of a few seconds (e.g., one to five seconds etc.), or less in elapsed time. That is, from a first time a request message is received until the desired electronic content is delivered, a few seconds of actual time elapse. However, the present invention is not limited to this embodiment and other time periods for real-time can be used to practice the invention.

In one embodiment, the first request message includes a QR bar code 98. In another embodiment, the first request message is encrypted with a pre-determined encryption method, including those described herein and others and encoded into the QR bar code 98. However, the present invention is not limited to this embodiment and other embodiments can be used to practice the invention.

In such an embodiment, any electronic content stored is given a unique QR bar code 98. When the desired electronic content is desired the QR code 98 is used to request and retrieve the desired electronic content.

In another embodiment, the first request message includes login information for one or more television sites, social networking sites, music distribution sites. However, the present invention is not limited to this embodiment and other embodiments can be used to practice the invention.

At Step 122, the cloud content location map 17 is retrieved securely on the first cloud application 30' on the cloud server network device 20. The cloud content location map 17 includes location addresses of the selected ones of the plural other different cloud server network devices 22, 24, 26 on the cloud communications network 18.

In FIG. 8B at Step 124, first cloud application 30' on the cloud server network device 20 sends plural second request messages for the desired cloud electronic content to the selected ones of the plural other different cloud server network devices 22, 24, 26 identified in the retrieved cloud content location map and located on the one or more public communication networks 76, the one or more private networks 72, community networks 78 and hybrid networks 78 comprising the cloud communications network 18.

At Step 126, the cloud computing application 30' on the server network device 20 receives plural response messages including one or more individual portions of the desired cloud electronic content 13' in one or more of cloud storage objects 82 from the selected ones of the plural other different cloud server network devices 22, 24, 26 on the public communication networks 76, the one or more private networks 72, community networks 74 and hybrid networks 78 comprising the cloud communications network 18.

At Step 128, the first cloud application 30' on the first server network device 20 combines the one or more individual components of the desired cloud electronic content 13' from the one or more cloud storage objects 82 from the received plural response messages into a final desired electronic cloud content component 13.

In FIG. 8C at Step 130, the first cloud application 30' on the cloud server network device 20 securely sends in real-time the final desired cloud electronic content component as the desired cloud electronic content 13 to the target network device 12 via the cloud communications network 18.

The second cloud application 30 on the target network device 12 cannot determine the desired cloud electronic content 13 was stored as plural portions 13 in plural cloud storage objects 82' and cannot determine which of plural selected ones of the other different cloud server network devices 22, 24, 26 on the one or more public 76, private 72, community 74 or hybrid networks 78 on the cloud communications network 18 may have stored portions 13' of the final desired cloud electronic content 13, thereby providing a second layer of security and privacy for the desired cloud electronic content on the cloud communications network 18.

In another embodiment, as was described above a whole portion 13 of the desired cloud electronic content can be requested by the target network device 12, and returned to the target network device 12 from the cloud server network device 20 after the desired cloud electronic 13 is retrieved as a whole portion 13 stored in 82 from another cloud server network device 22, 23, 24 on one or the networks 72, 74, 76, 78 of the cloud network 18.

The desired cloud electronic content 13 can be requested from the cloud communications network 18 and displayed by the second cloud application 30' on the target network device 12, 14, 16 anywhere the target network device 12 is physically located near and/or in communications with any server network devices 22, 24, 26 on any of the networks 72, 74, 76, 78 on the cloud communications network 18.

Redundant Electronic Content Storage with Cloud Computing Networks with Galois Fields FIG. 9 is a flow diagram illustrating a Method 132 for storing electronic content with cloud computing. At Step 134, the first cloud application on the cloud server network device sends plural third request messages to the selected ones of the plural other different cloud server network devices identified in the retrieved cloud content location map to de-activate the plural portions of desired cloud electronic content stored in the plural cloud storage objects stored on the selected ones of the plural other different cloud server network devices. At Step 136, the first cloud application determines new plural address locations of new selected ones of plural other different cloud server network devices each with one or more processors with the Galois field. At Step 138, the first cloud application securely stores the determined new plural address locations in the cloud content location map with the first cloud application in the first non-transitory computer readable medium on the cloud server network device. At Step 140, the first cloud application securely send the retrieved plural cloud storage objects to the new determined selected ones of the plural other different cloud servers on the cloud communications network with the determined plural address locations. The plural cloud storage objects are distributed and located in a new plural different locations on one or more public, private, community or hybrid networks on the cloud communications network.

Method 132 is illustrated with an exemplary embodiment. However, the present invention is not limited to this embodiment and other embodiments can be used to practice the invention.

At Step 134, the first cloud application 30' on the cloud server network device 20 sends plural third request messages to the selected ones of the plural of other different cloud server network devices 22, 24, 26 identified in the retrieved cloud content location map 17 to de-activate the plural portions 13' of desired cloud electronic content stored 13 in the plural cloud storage objects 82 stored on the selected ones of the plural other different cloud server network devices 22, 24, 26.

De-activating the plural portions 13' of the desired cloud electronic content 13 stored in the plural cloud storage objects 82 includes encrypting the plural cloud storage objects 82 or deleting the plural cloud storage objects 82.

If the plural cloud storage objects 82 are encrypted, they can be decrypted at a later time for retrieval. If the plural storage objects 82 are deleted, then they cannot be retrieved from the same server network devices without re-storing the plural cloud storage objects 82. However, the present invention is not limited to such embodiments other can be used to practice the invention.

In one embodiment, if the plural cloud storage objects 82 are encrypted (e.g., with a public or private encryption key for AES, DES, RSN, DLIES, ECIES, etc.) when subsequent requests for the desired electronic content 13 are made by the target network device 12, one or more of the encrypted plural cloud storage objects 82 on cloud server network devices 22, 24, 26 that are closest to a physical location of the target network device 12 are decrypted (e.g., with a corresponding public or private decryption key, etc.) and sent to the cloud network server 20 for processing.

This increases the efficiency and speed of electronic content delivery on the cloud communications network 18. In such an embodiment, the plural cloud storage objects 82 are duplicated and distributed in plural different locations on the cloud communications network, thereby providing an additional layer of redundancy and fault tolerance on the cloud network 18.

"Fault tolerance" is a system design feature that enables a system to continue operation, possibly at a reduced level (also known as graceful degradation), rather than failing completely, when some part of the system fails or goes off-line. The cloud communications network defined herein is a fault tolerant network. "Redundancy" is a duplication of critical components or functions or data storage of a system with the intention of increasing reliability of the system.

For example, if a first cloud network server 22 including a first cloud storage object 82 with a first portion 13' of desired electronic content failed or was taken off-line, a second cloud network server 24 including an encrypted copy of the first cloud storage object 82 and the same first portion 13' of the desired electronic content could be decrypted and sent to the cloud server network device 20 for processing.

At Step 136, the first cloud application 30' determines new plural address locations of new selected ones of plural other different cloud server network devices 22, 24, 26 each with one or more processors with the Galois field.

In one embodiment, the input to the Galois field includes physical location information of the target network device 12 and the output of the Galois field includes new plural address locations of new selected ones of the plural other different cloud server network devices 22, 24, 26 which are the closest to a current physical location of the target network device 12. However, the present invention is not limited to such embodiments other can be used to practice the invention.

At Step 138, the first cloud application 30' securely stores the determined new plural address locations in the cloud content location map 17 with the first cloud application 30' in the first non-transitory computer readable medium on the cloud server network device 20.

At Step 140, the first cloud application 30' securely sends the retrieved plural cloud storage objects to the new determined selected ones of the plural other different cloud servers 22, 22, 26 on the cloud communications network 18 with the determined plural address locations. The plural cloud storage objects 82 are re-distributed and located in new plural different locations on one or more public 76, private 72, community 74 or hybrid networks 78 on the cloud communications network 18.

In one embodiment a request for stored electronic content triggers the de-activation of the stored electronic content.

In another embodiment the first cloud application 30' automatically periodically retrieves the cloud content storage map and retrieves plural cloud storage objects for stored electronic content. Method 132 is then executed to periodically de-activate stored electronic content and re-distribute it and re-store to other networks 72, 74, 76, 78 on the cloud communications network 18. This automatic execution helps make the cloud network 18 more fault tolerant and provides redundancy of stored electronic content.

In another embodiment, as was described above for storing a whole portion 13, the cloud storage object 82 including the whole portion 13 of the desired cloud electronic content can be de-activated with encryption. The cloud storage object 82 including the whole portion 13 of the desired electronic content is then sent to a new cloud server network device 22, 24, 26 for storage in a new, different location one of the networks, 72, 74, 76, 78 on the cloud network 18.

The methods and systems described herein provide for electronic content storage and retrieval on cloud computing networks. The electronic content is divided into plural portions and stored in plural cloud storage objects. Storage locations for the plural cloud storage objects are selected using a Galois field and the plural cloud storage objects are distributed to various locations across the cloud network. When the electronic content is requested, the plural portions are retrieved and transparently combined back into the original electronic content. No server network devices storing the plural cloud storage objects can individually determine locations of all portions of the electronic content on the cloud communications network, thereby providing a first layer of security and privacy for the electronic content on the cloud communications network. No target network devices requesting the electronic content can determine where the electronic content is stored, thereby providing a second layer of security and privacy for the electronic content on the cloud communications network.

It should be understood that the architecture, programs, processes, methods and It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

We claim:

1. A method for automatic storage of electronic content with cloud computing, comprising:

creating on a cloud application on a cloud server network device with one or more processors, a modified Galois field $GF(p'')$: comprising:
   (a) selecting a prime integer p,
   (b) selecting an integer n greater than or equal to one,
   (c) selecting two or more irreducible polynomials $P1(x)$ and $P2(x)$ for field multiplication operations from a set of irreducible polynomials wherein a largest power for a lead variable in $P1(x)$ and $P2(x)$ includes p, n, or $p''$,
   (d) creating a Galois field lookup table,
   (e) creating a modified Galois field $GF(p'')$ with the two or more irreducible polynomials $P1(x)$ and $P2(x)$ and the Galois field lookup table,
   (f) generating $p''$ unique field elements for the modified Galois field $GF(p'')$;
   (g) populating a first portion of the Galois field lookup table with the generated $p''$ unique field elements, and
   (h) populating a second potion of the Galois field lookup table with a plurality of virtual network address locations, actual network address locations, virtual protocol port address designations and actual protocol port address designations, or combinations thereof, for locating a plurality of other cloud server network devices each with one or more processors on the cloud communications network;

securely storing the modified Galois field $GF(p'')$ with the cloud application in a non-transitory computer readable medium on the cloud server network device;

configuring with the cloud application the modified Galois field $GF(p'')$ for operation wherein:
   (a) one or more inputs to the modified Galois field $GF(p'')$ produces as a first internal output one of the $p''$ unique elements of the modified Galois field GF(p″) for indexing into the first portion of the Galois Field lookup table, and (b) the first internal output producing a second internal output from the second portion of the Galois Field lookup table including selected ones of the plurality of virtual network address locations, actual network address locations, virtual protocol port address designations and actual protocol port address designations, or combinations thereof;

receiving electronic content on the cloud application and storing the electronic content in the non-transitory computer readable medium on the cloud server network device via a cloud communications network comprising: one or more public communication networks, one or more private networks, one or more community networks and one or more hybrid networks;

splitting the received electronic content with the cloud application into a plurality of portions;

saving with the cloud application the plurality of potions in a plurality of cloud storage objects;

inputting from the cloud application one or more pre-determined inputs into the modified Galois field GF(p″) securely stored on the cloud server network device;

outputting with the cloud application from the modified Galois field GF(p″) for each one or more pre-determined inputs into the modified Galois Field GF(p″) a plurality of address locations including: the virtual network address locations, actual network address locations, virtual protocol port address designations and actual protocol port address designations, or combinations thereof, stored in the Galois Field lookup table in the modified Galois Field GF(p″), wherein the plurality of address locations are located anywhere on the one or more public communication networks, one or more private networks, one or more community networks and one or more hybrid networks of the cloud communications network;

storing securely the plurality of address locations output from the modified Galois field GF(p″) in a cloud content location map with the cloud application in the non-transitory computer readable medium on the cloud server network device;

sending securely the plurality of cloud storage objects to the plurality of other cloud servers on the cloud communications network with the plurality of address locations output from the modified Galois field GF(p″), wherein the plurality of cloud storage objects are distributed and located in a plurality of other locations on the cloud communications network; and providing a layer of security and privacy for the electronic content on the cloud communications network with the plurality of address locations output from the modified Galois field GF(p″) securely stored in the cloud content location map, wherein none of the plurality of other cloud server network devices can individually determine locations of all portions of the received electronic content on the cloud communications network.

2. The method of claim 1 wherein the step of outputting from modified Galois field GF(p″) includes outputting a plurality of virtual cloud communication network addresses, a plurality of Internet Protocol (IP) addresses, a plurality of Medium Access Control (MAC) addresses, Transmission Control Protocol (TCP) port designations, User Datagram Protocol (UDP) port designations, other virtual or actual networking protocol port designations or a combination thereof, of the selected ones of the plurality of other cloud server network devices on the cloud communications network.

3. The method of claim 1 wherein the modified Galois field GF(p″) produces the output by completing one or more field operations including field multiplication operations on two or more inputs to the modified Galois field GF(p″).

4. The method of claim 1 wherein the modified Galois field GF(p″) includes two or more irreducible polynomials P1(x) and P2(x) with a largest power for a lead variable of the two or more irreducible polynomials of at least eight and field operations are completed over the two or more irreducible polynomials P1(x) and P2(x).

5. The method of claim 1 wherein the cloud storage object includes one or more of a Representational State Transfer (REST) or Simple Object Access Protocol (SOAP), Lightweight Directory Access Protocol (LDAP) cloud storage objects, portions thereof, or combinations thereof.

6. The method of claim 1 wherein the step of storing securely cloud content location map includes securely storing the cloud content location map in an encrypted format including using a Discrete Logarithm Integrated Encryption Scheme (DLIES), a Elliptic Curve Integrated Encryption Scheme (ECIES), a user generated biometric encryption method, or a Homomorphic encryption method.

7. The method of claim 1 wherein the sending securely step includes securely sending using a Wireless Encryption Protocol (WEP), Wireless-Wi-Fi Protected Access (WPA), Robust Security Network (RSN), Advanced Encryption Standard (AES), Data Encryption Standard (DES), Triple Data Encryption Standard (3DES), Secure Hash Algorithm (SHA), Message Digest-5 (MD-5), Electronic Code Book (ECB), Diffie and Hellman (DH), HyperText Transport Protocol Secure, (HTTPs), Secure Sockets Layer (SSL), Transport Layer Security (TLS) security method, Discrete Logarithm Integrated Encryption Scheme (DLIES), a Elliptic Curve Integrated Encryption Scheme (ECIES), biometric or a Homomorphic encryption method.

8. The method of claim 1 wherein the cloud server network device and the target network device include a wireless networking interface comprising a Worldwide Interoperability for Microwave Access (WiMax) wireless networking interface with $4^{th}$ generation (4G) wireless speeds for communicating with the cloud communications network.

9. The method of claim 1 wherein the cloud communications network includes an electronic content storage and retrieval service, a cloud computing platform for the electronic content storage and retrieval service and a cloud computing infrastructure for the an electronic content storage and retrieval service.

10. The method of claim 1 wherein the cloud communications network includes on-demand electronic content storage and retrieval services, broadband network access, resource pooling, rapid elasticity and measured network services for an electronic content storage and retrieval services.

11. The method of claim 1 wherein the cloud application offers a cloud computing Infrastructure as a Service (IaaS), a cloud Platform as a Service (PaaS) and offers a Specific cloud software service as a Service (SaaS) including a specific cloud software service for electronic content storage and retrieval.

12. The method of claim 1 further comprising:
receiving in real-time a first request message on a first cloud application on the cloud server network device with the one or more processors from a second cloud application stored in a second non-transitory computer readable medium on a target network device with one or more processors via the cloud communications network, wherein the first request message includes a request for desired cloud electronic content stored in the plurality of cloud storage objects stored on the selected ones of the plurality of other cloud server network devices distributed across one or more of the network comprising the cloud communications network, and wherein the plurality of cloud storage objects function as a single, transparent secure storage object for electronic content on the cloud communications network;

retrieving securely the cloud content location map on the first cloud application on the cloud server network device, wherein the cloud content location map includes the determined plurality of types of address locations output from the modified Galois field $GF(p'')$ of the selected ones of the plurality of other cloud server network devices on the cloud communications network;

sending from the first cloud application on the cloud server network device a plurality of second request messages for the desired cloud electronic content to the selected ones of the plurality of other cloud server network devices identified in the retrieved cloud content location map and located on the public communication network, the one or more private networks, community networks and hybrid networks comprising the cloud communications network;

receiving on the first cloud application on the cloud server network device a plurality of response messages including one or more individual portions of the desired cloud electronic content in the plurality of cloud storage objects from the selected ones of the plurality of other cloud server network devices on the public communication network, the one or more private networks, community networks and hybrid networks comprising the cloud communications network;

combining transparently on the first cloud application on the cloud server network device the one or more individual components of the desired cloud electronic content from the plurality of cloud storage objects from the received plurality of response messages into a final desired electronic cloud content component;

sending securely in real-time the final desired cloud electronic content component as the requested desired cloud electronic content from the first cloud application on the cloud server network device to the target network device via the cloud communications network; and providing another layer of security and privacy for the desired cloud electronic content on the cloud communications network with the determined plurality of types of address locations output from the modified Galois field $GF(p'')$ securely stored in the cloud content location map, wherein the second cloud application on the target network device cannot determine the desired cloud electronic content was stored in the retrieved plurality of cloud storage objects and cannot determine which of the selected ones of the plurality of other cloud server network devices on which the one or more public, private, community or hybrid networks on the cloud communications network may have stored portions of the desired cloud electronic content.

13. The method of claim 12 wherein the first and the second cloud applications include access to a plurality of television sites, Internet television sites, social networking sites, music distribution sites or search engine sites.

14. The method of claim 12 wherein the first request message from the target network device includes a QR bar code.

15. The method of claim 14 wherein the first request message is encrypted with a pre-determined encryption method and encoded into the QR bar code.

16. The method of claim 12 wherein the desired cloud electronic content can be requested from the cloud communications network and displayed by the second cloud application on the target network device anywhere the target network device is physically located near or in communications with, any server network device on of the plurality of networks comprising the cloud communications network.

17. The method of claim 12 further comprising:

sending from the first cloud application on the cloud server network device a plurality of third request messages to the selected ones of the plurality of other cloud server network devices identified in the retrieved cloud content location map to deactivate the plurality of portions of desired cloud electronic content stored in the plurality of cloud storage objects stored on the selected ones of the plurality of other cloud server network devices;

determining from the first cloud application a new plurality of types of address locations of new selected ones of a plurality of other cloud server network devices each with one or more processors with a plurality of new inputs to the modified Galois filed and a plurality of new outputs from the modified Galois field $GF(p'')$;

storing securely with the first cloud application the determined new plurality of address locations in the cloud content location map with the first cloud application in the non-transitory computer readable medium on the cloud server network device; and sending securely from the first cloud application the received plurality of cloud storage objects to the new determined selected ones of the plurality of other cloud servers on the cloud communications network with the determined plurality of address locations, wherein the retrieved plurality of cloud storage objects are distributed and located in a new plurality of other locations on one or more public, private, community or hybrid networks on the cloud communications network.

18. The method of claim 17 wherein de-activating the plurality of portions of desired cloud electronic content stored in the plurality of cloud storage objects includes encrypting the plurality of cloud storage objects or deleting the plurality of cloud storage objects.

19. The method of claim 16 further comprising:

inputting to the modified Galois field $GF(p'')$ as one or more inputs a plurality of physical location information of the target network device; and outputting from the modified Galois field $GF(p'')$ a new plurality of types of address locations of new selected ones of the plurality of other cloud server network devices which are the closest to a current physical location of the target network device.

20. A system for electronic content storage and retrieval on a cloud computing network, comprising in combination:

a cloud communications network;

one or more cloud server network devices with one or more one or more target network devices with one or more processors;

the one or more processors on the one or more network devices including a plurality of instructions stored in a non-transitory computer readable medium configuring the one or more processors for:

for creating on a cloud application on a cloud server network device with one or more processors, a modified Galois field $GF(p'')$: comprising:

(a) for selecting a prime integer p,
(b) for selecting an integer n greater than or equal to one,
(c) for selecting two or more irreducible polynomials P1(x) and P2(x) for field multiplication operations from a set of irreducible polynomials wherein a largest power for a lead variable in P1(x) and P2(x) includes p, n, or $p^n$,
(d) for creating a Galois field lookup table,
(e) for creating a modified Galois field $GF(p^n)$ with the two or more irreducible polynomials P1(x) and P2(x) and the Galois field lookup table,
(f) for generating $p^n$ unique field elements for the modified Galois field $GF(p^n)$;
(g) for populating a first portion of the Galois field lookup table with the generated $p^n$ unique field elements, and
(h) for populating a second potion of the Galois field lookup table with a plurality of virtual network address locations, actual network address locations, virtual protocol port address designations and actual protocol port address designations, or combinations thereof, for locating a plurality of other cloud server network devices each with one or more processors on the cloud communications network;
for securely storing the modified Galois field $GF(p^n)$ with the cloud application in a non-transitory computer readable medium on the cloud server network device;
for configuring with the cloud application the modified Galois field $GF(p^n)$ for operation wherein:
(a) one or more inputs to the modified Galois field $GF(p^n)$ produces as a first internal output one of the $p^n$ unique elements of the modified Galois field $GF(p^n)$ for indexing into the first portion of the Galois Field lookup table, and
(b) the first internal output producing a second internal output from the second portion of the Galois Field lookup table including selected ones of the plurality of virtual network address locations, actual network address locations, virtual protocol port address designations and actual protocol port address designations, or combinations thereof;
for receiving electronic content on the cloud application and storing the electronic content in the non-transitory computer readable medium on the cloud server network device via a cloud communications network comprising: one or more public communication networks, one or more private networks, one or more community networks and one or more hybrid networks;
for splitting the received electronic content with the cloud application into a plurality of portions;
for saving with the cloud application the plurality of potions in a plurality of cloud storage objects;
for inputting from the cloud application one or more pre-determined inputs into the modified Galois field $GF(p^n)$ securely stored on the cloud server network device;
for outputting with the cloud application from the modified Galois field $GF(p^n)$ for each one or more pre-determined inputs into the modified Galois Field $GF(p^n)$ a plurality of address locations including: the virtual network address locations, actual network address locations, virtual protocol port address designations and actual protocol port address designations, or combinations thereof, stored in the Galois Field lookup table in the modified Galois Field $GF(p^n)$,
wherein the plurality of address locations are located anywhere on the one or more public communication networks, one or more private networks, one or more community networks and one or more hybrid networks of the cloud communications network;
for storing securely the plurality of address locations output from the modified Galois field $GF(p^n)$ in a cloud content location map with the cloud application in the non-transitory computer readable medium on the cloud server network device;
for sending securely the plurality of cloud storage objects to the plurality of other cloud servers on the cloud communications network with the plurality of address locations output from the modified Galois field $GF(p^n)$,
wherein the plurality of cloud storage objects are distributed and located in a plurality of other locations on the cloud communications network; and
for providing a layer of security and privacy for the electronic content on the cloud communications network with the plurality of address locations output from the modified Galois field $GF(p^n)$ securely stored in the cloud content location map, wherein none of the plurality of other cloud server network devices can individually determine locations of all portions of the received electronic content on the cloud communications network;
for receiving in real-time a first request message on the cloud application on the cloud server network device with the one or more processors from another cloud application stored in another non-transitory computer readable medium on a target network device with one or more processors via the cloud communications network,
wherein the first request message includes a request for desired cloud electronic content stored in the plurality of cloud storage objects stored on the selected ones of the plurality of other cloud server network devices distributed across one or more of the network comprising the cloud communications network, and
wherein the plurality of cloud storage objects function as a single, transparent secure storage object for electronic content on the cloud communications network;
for retrieving securely the cloud content location map on the cloud application on the cloud server network device, wherein the cloud content location map includes the determined plurality of types of address locations output from the modified Galois field $GF(p^n)$ of the selected ones of the plurality of other cloud server network devices on the cloud communications network;
for sending from the cloud application on the cloud server network device a plurality of second request messages for the desired cloud electronic content to the selected ones of the plurality of other cloud server network devices identified in the retrieved cloud content location map and located on the public communication network, the one or more private networks, community networks and hybrid networks comprising the cloud communications network;
for receiving on the cloud application on the server network device a plurality of response messages including one or more individual portions of the desired cloud electronic content in the plurality of cloud storage objects from the selected ones of the plurality of other cloud server network devices on the public communication network, the one or more private networks, community networks and hyhrid networks comprising the cloud communications network;
for combining transparently on the cloud application on the server network device the one or more individual components of the desired cloud electronic content from the plurality of cloud storage objects from the received plurality of response messages into a final desired electronic cloud content component;

for sending securely in real-time the final desired cloud electronic content component as the requested desired cloud electronic content from the cloud application on the cloud server network device to the target network device via the cloud communications network; and for providing another layer of security and privacy for the desired cloud electronic content on the cloud communications network with the determined plurality of types of address locations output from the modified Galois field $GF(p'')$ securely stored in the cloud content location map, wherein the second cloud application on the target network device cannot determine the desired cloud electronic content was stored in the retrieved plurality of cloud storage objects and cannot determine which of the selected ones of the plurality of other cloud server network devices on which the one or more public, private, community or hybrid networks on the cloud communications network may have stored portions of the desired cloud electronic content.

* * * * *